(12) United States Patent
Kawai

(10) Patent No.: US 7,926,724 B2
(45) Date of Patent: Apr. 19, 2011

(54) ARTICLE TRANSPORT MATERIAL

(75) Inventor: Wakahiro Kawai, Kyoto (JP)

(73) Assignee: Omron Corporation, Kyoto (JP)

( * ) Notice: Subject to any disclaimer, the term of this patent is extended or adjusted under 35 U.S.C. 154(b) by 724 days.

(21) Appl. No.: 11/660,493

(22) PCT Filed: Sep. 9, 2005

(86) PCT No.: PCT/JP2005/016646
§ 371 (c)(1),
(2), (4) Date: Feb. 20, 2007

(87) PCT Pub. No.: WO2006/030713
PCT Pub. Date: Mar. 23, 2006

(65) Prior Publication Data
US 2007/0295822 A1 Dec. 27, 2007

(30) Foreign Application Priority Data
Sep. 13, 2004 (JP) .................. 2004-265341

(51) Int. Cl.
*G06K 7/10* (2006.01)
(52) U.S. Cl. ........ 235/486; 235/439; 235/451; 235/483; 235/492
(58) Field of Classification Search .................. 235/486, 235/439, 451, 483, 492
See application file for complete search history.

(56) References Cited

U.S. PATENT DOCUMENTS

| | | | |
|---|---|---|---|
| 4,750,197 A | 6/1988 | Denekamp | |
| 5,929,779 A | 7/1999 | MacLellan et al. | |
| 5,971,592 A | 10/1999 | Kralj et al. | |
| 6,294,114 B1 | 9/2001 | Muirhead | |
| 6,294,999 B1 * | 9/2001 | Yarin et al. | 340/573.1 |
| 6,563,425 B2 * | 5/2003 | Nicholson et al. | 340/572.7 |
| 6,661,339 B2 | 12/2003 | Muirhead | |
| 6,665,582 B1 | 12/2003 | Moritz et al. | |
| 6,718,888 B2 | 4/2004 | Muirhead | |
| 6,749,418 B2 | 6/2004 | Muirhead | |
| 6,809,703 B2 * | 10/2004 | Serra | 343/895 |
| 6,927,688 B2 * | 8/2005 | Tice | 340/539.26 |
| 7,342,496 B2 | 3/2008 | Muirhead | |
| 2002/0030597 A1 * | 3/2002 | Muirhead | 340/572.1 |
| 2004/0082296 A1 | 4/2004 | Twitchell, Jr. | |
| 2005/0186902 A1 * | 8/2005 | Lieffort et al. | 455/41.1 |
| 2006/0232412 A1 * | 10/2006 | Tabacman et al. | 340/572.1 |

FOREIGN PATENT DOCUMENTS

JP 2002-154618 5/2002

(Continued)

OTHER PUBLICATIONS

Office Action for Chinese Application No. 2005-80030500.9 dated Feb. 6, 2009. European Search Report and Opinion.

*Primary Examiner* — Thien M. Le
*Assistant Examiner* — Christle I Marshall
(74) *Attorney, Agent, or Firm* — Dickstein Shapiro LLP

(57) ABSTRACT

An article transport material loaded with an article on a base and used for transport includes noncontact communication means for conducting noncontact communications with a noncontact IC tag put on the article and portable power supply means for supplying electric power to the noncontact communication means, wherein the communication direction of the noncontact communication means is directed to the area above the base.

12 Claims, 17 Drawing Sheets

FOREIGN PATENT DOCUMENTS

| | | |
|---|---|---|
| JP | 2002-271229 | 9/2002 |
| JP | 2003-11973 | 1/2003 |
| JP | 2003-11973 A | 1/2003 |
| JP | 2004-168468 A | 6/2004 |
| JP | 2002-179066 | 6/2006 |
| WO | WO-2004/066236 | 8/2004 |

* cited by examiner

FIG. 11

DATA IN NONCONTACT IC TAG

| RECORD NO. | POSITION | TIME | TEMPERATURE | HUMIDITY | SHOCK | PALETTE NO. |
|---|---|---|---|---|---|---|
| 1 | LATITUDE-LONGITUDE | DAYS/HOURS/MINUTES | +25°C | 70% | | 123-456 |
| 2 | LATITUDE-LONGITUDE | DAYS/HOURS/MINUTES | -10°C | --- | | 123-456 |
| 3 | LATITUDE-LONGITUDE | DAYS/HOURS/MINUTES | -10°C | --- | | 123-456 |
| 4 | INTRA-WAREHOUSE ADDRESS | DAYS/HOURS/MINUTES | -10°C | --- | | 100-1234 |
| 5 | INTRA-WAREHOUSE ADDRESS | DAYS/HOURS/MINUTES | +10°C | --- | | 100-1234 |
| 6 | INTRA-WAREHOUSE ADDRESS | DAYS/HOURS/MINUTES | -10°C | 50% | × | 100-1234 |
| 7 | LATITUDE-LONGITUDE | DAYS/HOURS/MINUTES | +30°C | 80% | | 100-1234 |
| 8 | LATITUDE-LONGITUDE | DAYS/HOURS/MINUTES | | | | 123-456 |
| ... | ... | ... | ... | ... | ... | ... |

FIG. 12

DATA IN CONTROLLER

| RECORD NO. | POSITION | TIME | TEMPERATURE | HUMIDITY | SHOCK | TAG ID (OR COMMODITY NO., COMMODITY NAME, ETC.) |
|---|---|---|---|---|---|---|
| 1 | LATITUDE-LONGITUDE | DAYS/HOURS/MINUTES | +25°C | 70% | | OO-OOO, OO-OOO, OO-OOO, OO-OOO, A B-C D E, OO-OOO, |
| 2 | LATITUDE-LONGITUDE | DAYS/HOURS/MINUTES | -10°C | --- | | OO-OOO, OO-OOO, OO-OOO, OO-OOO, A B-C D E, OO-OOO, |
| 3 | LATITUDE-LONGITUDE | DAYS/HOURS/MINUTES | RECORD OF ACCESS FROM MOBILE TELEPHONE | | | |
| 4 | LATITUDE-LONGITUDE | DAYS/HOURS/MINUTES | -10°C | --- | | OO-OOO, OO-OOO, OO-OOO, OO-OOO, A B-C D E, OO-OOO |
| 5 | INTRA-WAREHOUSE ADDRESS | DAYS/HOURS/MINUTES | -10°C | --- | | OO-OOO, OO-OOO, OO-OOO |
| 6 | INTRA-WAREHOUSE ADDRESS | DAYS/HOURS/MINUTES | -10°C | --- | | OO-OOO, OO-OOO, OO-OOO, x x-x x x |
| 7 | INTRA-WAREHOUSE ADDRESS | DAYS/HOURS/MINUTES | -10°C | --- | | OO-OOO, OO-OOO, OO-OOO, x x-x x x x, x x-x x x |
| 8 | INTRA-WAREHOUSE ADDRESS | DAYS/HOURS/MINUTES | -10°C | --- | | OO-OOO, OO-OOO, OO-OOO, x x-x x x x, x x-x x x |
| 9 | LATITUDE-LONGITUDE | DAYS/HOURS/MINUTES | +30°C | 80% | | OO-OOO, OO-OOO, OO-OOO, x x-x x x, A B-C D E |
| ... | ... | ... | ... | ... | ... | ... |

ARTICLE TRANSPORT MATERIAL

RELATED APPLICATIONS

The present application is a national stage application of International Application No. PCT/JP2005/016646, filed on Sep. 9, 2005, which in turn claims priority to Japanese Patent Application No. 2004-265341, filed Sep. 13, 2004, filed May 26, 2006, the disclosures of which are hereby incorporated by reference.

TECHNICAL FIELD

This invention relates to an article transport material such as a pallet or a container used for transporting articles, for example.

BACKGROUND ART

To foster automation of physical distribution, it becomes necessary to make it possible to read the descriptions of slips, etc., put on articles, etc., by a machine.

Hitherto, for this purpose, a bar code label corresponding to the description of each slip has been put on the slip.

However, to read the bar code label using a bar code reader, the bar code label and the bar code reader must be related to each other with respect to the given distance and the given direction with high accuracy and thus much labor is required and a bottleneck is produced for smoothing physical distribution. Further, since the amount of information that can be input to a bar code is small, the management range of physical distribution is also limited to a narrow district.

In recent years, a noncontact IC tag that can be read in a noncontact manner using an electromagnetic wave has been used. Since an electromagnetic wave is used as a read medium, when the noncontact IC tag is read, distance and directional restrictions are not much received and it is easy to reliably read the description of the noncontact IC tag.

Individual information of the article to be managed can be stored in the IC in the noncontact IC tag in a large capacity. Therefore, it is also made possible to use the storage function of the individual information as security information to identify the individual.

Usually, to use such a noncontact IC tag in a physical distribution management system, information in the noncontact IC tag is read using conveyor-type readers as shown in FIG. 17, gate-type readers as shown in FIG. 18, or the like.

More particularly, articles 100, 200, etc., on which noncontact IC tags 101 and 201 are put are transported with a conveyor 120, a forklift 220, or the like and are allowed to pass through the space between the readers 110 and 111 (FIG. 17) or between the readers 210 and 211 (FIG. 18).

At this time, the data in the noncontact IC tag 101, 201 is read through the readers 210 and 211 and is transmitted to a computer 130, 230 via a connection line 112, 212.

The computer 130, 230 is connected to a network in a mode as shown in a system configuration drawing of FIG. 19 to form a part of a physical distribution management system and thus the data read through the readers 210 and 211 and transmitted to the computer is used for management of the whole physical distribution process.

However, the conveyor-type readers 110 and 111 or the gate-type readers 210 and 211 are intended for checking the situation of each article when the article passes through the communication area between the readers, and cannot manage the state of the article until passage through the next readers after passage through the readers.

That is, the comings and goings of articles can be grasped, but the readers have no effect in managing the locations and the storage state of the inventory articles, tracking the transport route at the transporting time, or preventing an article mix-up, erroneous distribution, etc.; this is a problem.

As a method for solving the problem, a physical distribution management system for storing data in a noncontact IC tag put on an article in a wireless communication unit installed on a loading platform of a pallet, etc., loaded with the article as freight information when it passes through gate-type readers is proposed (refer to JPA-2002-154618).

The physical distribution management system uses the freight information for each pallet in the wireless communication unit for physical distribution management, thereby managing different articles in pallet units. Bluetooth is used for the wireless communication unit, whereby a communication distance of several meters is made possible and location management and transport route tracking of the articles are conducted.

However, management information concerning the storage state of freight on each pallet such as pulling out of articles in solid body units or adding of other articles after passage through gate-type readers, etc., cannot be grasped; this is a problem.

It is also difficult to conduct storage management for mixing articles in transporting, temporarily storing articles in the process of being transported, etc., and conduct location management in the outdoors, in a huge warehouse, etc.

Further, since articles need to be passed through conveyor-type readers or gate-type readers in carrying in and carrying out, the carrying-in and carrying-out paths are limited and freight is tied up in front of each reader; this is a problem.

On the other hand, as a general use method of a noncontact IC tag, data can be written into memory in the noncontact IC tag at each physical distribution site and can be used for physical distribution passage management of the article.

However, in the method in the related art using conveyor-type readers or gate-type readers, the data input at each site can be changed as desired and the data is poor in reliability as management data; this is a problem.

Further, in the physical distribution management system in the related art as described above, unless all traders involved in each step invest in readers and data in all traders is associated via a network as shown in FIG. 19, a complete physical distribution management system cannot be constructed; this is a problem.

Therefore, if a large effect produced by introducing a physical distribution system using noncontact IC tags cannot be expected, the cost burden on the traders becomes excessive and thus introducing a physical distribution system using noncontact IC tags is delayed; this is a problem.

Consequently, penetration of a reader/writer that can communicate with a noncontact IC tag does not increase and use of a noncontact IC tag does not grow; this is the current state of affairs.

DISCLOSURE OF THE INVENTION

Problems to be Solved by the Invention

It is therefore an object of the invention to provide an article transport material that can communicate with a noncontact IC tag of an article loaded on the top of a base without installing a reader/writer for communicating with a noncontact IC tag at each site, etc., in a physical distribution process and improve user satisfaction.

Means for Solving the Problems

The invention is characterized by an article transport material used for loading an article on its base and transporting the article, the article transport material including noncontact communication means for conducting noncontact communications with a noncontact IC tag put on the article and portable power supply means for supplying electric power to the noncontact communication means, wherein the communication direction of the noncontact communication means is directed to the area above the base.

The communication direction may be determined so that the placed article falls within the communication area in such a manner that the noncontact communication means is provided on both left and right sides or in four front and rear and left and right side parts and the communication direction is set to the slanting upward direction on the center side or that the noncontact communication means is provided at the center and the communication direction is set to the upward direction, for example, if the article transport material is a pallet. If the article transport material is a box container, for example, the communication direction may be determined so that the placed article falls within the communication area in such a manner that the noncontact communication means is provided in one or more places of the top face, the bottom face, the front, the rear, the right side, the left side, sides, or corners and the communication direction is set to the inside.

The portable power supply means may be formed of a portable power supply of a battery, a dry battery, etc., and may be attached detachably or undetachably to the article transport material. Although it is desirable that the portable power supply means should be a rechargeable power supply such as a battery or a rechargeable dry battery, the portable power supply means can also be disposable as a power supply of an unchargeable dry battery, etc.

According to the described configuration, the noncontact communication means can communicate with a noncontact IC tag put on an article. Since the communication direction is directed to the area above the base, communications with the noncontact IC tag put on an article loaded into the adjacent article transport material can be prevented if a plurality of article transport materials are placed side by side.

Since the communication area of the noncontact communication means can be placed only within the area above the base, it is made possible for the article transport material to reliably communicate only with the noncontact IC tag of the article loaded into the base of the article transport material.

Since the article transport material is moved with the portable power supply means, the described communications can be conducted regardless of the place.

It is made possible to distribute the article transport material together with the article on which the noncontact IC tag is put and the article transport material can communicate with the noncontact IC tag, so that it becomes unnecessary to pass any article through a gate type reader. Therefore, it is made possible to read the data in the noncontact IC tag with no labor.

Acceptance means implemented as communication means for receiving and accepting an execution command signal from an external unit and control means, connection means of a USB interface, etc., connected to an external unit for accepting an execution command signal and control means, or operation input means formed of a press button, a touch panel, etc., for accepting operation input may be provided.

Output means implemented as communication means for transmitting information to an external unit and control means, connection means of a USB interface, etc., connected to an external unit for transmitting information and control means, or display means formed of a liquid crystal display, etc., for displaying text and an image may be provided.

As a form of the invention, the communication distance of the noncontact communication means can be limited to such an extent that the noncontact communication means would be able to communicate with a noncontact IC tag within the loading range in which articles can be loaded above the base.

The communication distance may be set to almost the same as the boundary portion of the loading range or a little outside the boundary portion of the loading range. According to the described configuration, if a plurality of article transport materials are placed in the up and down direction in such a manner that the article transport materials each loaded with an article are placed on the first and second floors of a warehouse, communications with the noncontact IC tag of an article loaded into another article transport material existing in the up and down direction can be prevented. If the article transport materials are containers, for example, communications with the noncontact IC tag of an article loaded into another container in the containers placed in the up and down direction can be prevented.

As a form of the invention, a plurality of the noncontact communication means can be disposed in the periphery of the base and the communication direction of each noncontact communication means is directed to the upper inside. Accordingly, reliable communications with the noncontact IC tag of an article loaded above the base can be conducted and communications with the noncontact IC tag of an article loaded into another article transport material placed side by side can be reliably prevented.

As a form of the invention, the article transport material can include a fork insertion section for allowing a fork of a forklift to insert from a side, wherein the means can be disposed circumventing the fork insertion section.

Accordingly, the article transport material can be used to communicate with the noncontact IC tag put on an article and use of the noncontact IC tag for physical distribution management can be promoted.

Since the means can be disposed circumventing the fork insertion section, if a pallet is loaded and unloaded with a forklift or is moved from one place to another in the physical distribution process, the communication function with the noncontact IC tag is not impaired and a failure can be prevented for prolonging the life.

As a form of the invention, the means can be disposed circumventing the top and bottom positions of the fork insertion section. Accordingly, when the article transport material is lifted up with a fork lift, load can be prevented from concentrating on each means and damage to each means can be prevented.

As a form of the invention, the article transport material can include an electromagnetic shield for blocking a radio wave so as not to communicate with a noncontact IC tag outside the area above the base. The electromagnetic shield may be formed of a radio wave blockage material such as a net formed of aluminum foil or metal fiber and may be formed like a sheet for covering a placed article or may use a radio wave blockage material on the exterior if the article transport material is a container.

According to the described configuration, communications with the noncontact IC tag of an article not loaded into the article transport material can be reliably prevented. Therefore, if a different article transport material is placed nearby, communications with the noncontact IC tag of an article loaded into the different article transport material can be prevented.

As a form of the invention, the article transport material can include external unit communication means for communicating with an external unit through a communication line aside from the noncontact communication means and control means for controlling execution of communications with a noncontact IC tag in accordance with an execution command signal received from the external unit and transmission of acquired information to the external unit.

The communication line may be implemented as a communicatable line of a mobile communication network used for communications of a mobile unit such as a mobile telephone or a PDA, the Internet, an intranet, or the like. It is desirable that the communication line should be implemented as a wide-area communication line such as a mobile communication network or the Internet.

The external unit may be implemented as a mobile telephone, a PDA, a portable information terminal such as a notebook personal computer, or a stationary information terminal such as a desktop personal computer.

According to the described configuration, the article transport material can be accessed from the external unit; for example, it is made possible to access the article transport material from a remote location. If the user does not have a reader/writer that can communicate with a noncontact IC tag, the article transport material can be accessed from the external unit and communications with the noncontact IC tag can be conducted as required.

The timing at which the control means executes predetermined processing, such as the noncontact communication timing communicating with a noncontact IC tag may be an appropriate timing when the external unit communication means receives an execution command from an external unit, when time recognition means recognizes a predetermine time or a predetermined time passage, when environmental information acquisition means acquires predetermined environmental information, when position information acquisition means detects a predetermined-distance move, when an execution command is received through the input means of a press button, a touch panel, etc., or the like.

As a form of the invention, the external unit communication means can be disposed in a side part of the whole shape. The side part includes the front, the rear, the right side, or the left side of the article transport material.

Accordingly, if a plurality of article transport materials are placed in the up and down direction, another article transport material existing above or below can be prevented from interfering with wireless communications of external communication means of each article transport material with an external unit, and each article transport material can separately communicate with an external unit stably.

As a form of the invention, the whole shape can be formed like a pallet shape for placing an article. Accordingly, communications with a noncontact IC tag put on an article can be conducted in a pallet often used for transporting an article.

As a form of the invention, the whole shape can be formed like a box container shape for storing an article. Accordingly, communications with a noncontact IC tag put on an article can be conducted in a container often used for transporting an article.

As a form of the invention, the article transport material can include information acquisition means for acquiring information concerning the placement situation. The information acquisition means may be position information acquisition means for acquiring the current position information and/or environmental information acquisition means for acquiring the current environmental information.

The position information acquisition means maybe implemented as a GPS for acquiring position information of the latitude and the longitude using the GPS (Global Positioning System). It may be implemented as a noncontact IC reader disposed for each section for acquiring position information in a noncontact manner from a noncontact IC tag storing the position information of the section.

The environmental information acquisition means may be implemented as one or more of temperature information acquisition means for acquiring temperature information in the location where the home article transport material exists, humidity information acquisition means for acquiring humidity information in the location where the home article transport material exists, or shock information acquisition means for acquiring shock information received in the location where the home article transport material exists.

According to the described configuration, the information concerning the placement situation, such as position information or environmental information (temperature, humidity, shock), can be acquired and physical distribution management, can be conducted.

Therefore, it is made possible to acquire the situation in which the noncontact IC tag is placed or the situation in which the article associated with the noncontact IC tag is placed or trace or certify the situation after writing into the noncontact IC tag or separate storage means.

To determine the position where the article transport material exists, if the position information is read, where the noncontact IC tag or the article associated with the noncontact IC tag exists or existed can be determined.

Advantages of the Invention

According to the invention, the article transport material can be used to communicate with the noncontact IC tag of an article loaded above the base.

BRIEF DESCRIPTION OF THE DRAWINGS

FIG. 11 is a data schematic representation in memory of a noncontact IC tag.

FIG. 12 is a data schematic representation in memory of the controller.

Figure 1:
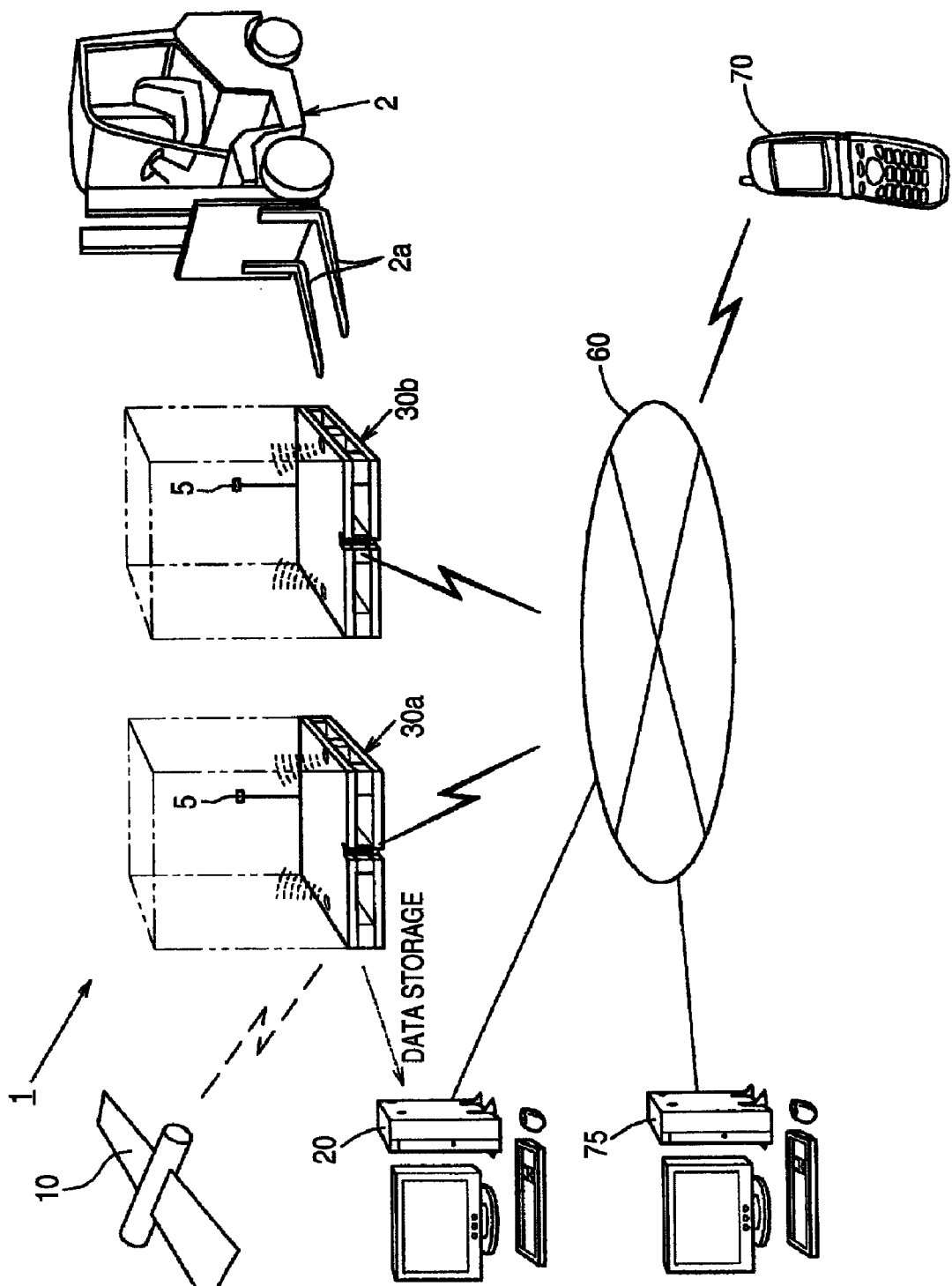
FIG. 1 is a system configuration drawing of a physical distribution management system.

DESCRIPTION OF REFERENCE NUMERALS 30, 30a, 30b Management pallet
31 Fork hole
32 Controller
33 Mobile antenna
34 GPS
36, 36a, 36b Sensing unit
37, 37a, 37b IC tag reader/writer
38 Battery
51 Article
55 Noncontact IC tag
60 Mobile communication network
70 Mobile telephone

BEST MODE FOR CARRYING OUT THE INVENTION

One embodiment of the invention will be discussed below with the accompanying drawings. To begin with, the system configuration of a physical distribution management system 1 will be discussed with a system configuration drawing of FIG. 1.

The physical distribution management system 1 is made up of a GPS satellite 10, a storage server 20, a plurality of management pallet s 30 (30a, 30b, . . . ), a mobile communication network 60, a mobile telephone 70, and a charging server 75.

The GPS satellite 10 communicates with a GPS contained in each management pallet 30 for measuring the position of the GPS and transmitting position information of latitude and longitude, etc., to the GPS.

The storage server 20 is a server for storing data and acquires and records data concerning physical distribution from the management pallet 30 completing the physical distribution sequence. The storage server 20 is connected to the mobile communication network 60 and can be accessed from the mobile telephone 70 and any other external terminal.

The storage server 20 may be connected to another communication network such as the Internet rather than the mobile communication network 60 for allowing access from any other external terminal such as a personal computer. The storage server 20 may be unconnected to any communication networks.

The storage server 20 may be installed in a trader involved in physical distribution like an article manufacturer, dealer, etc., or a third party for monitoring the physical distribution situation in response to the use.

The management pallet 30 is a pallet for being loaded with a plurality of articles and transporting the articles by a forklift 2, etc. It contains a tag reader/writer for communicating with a noncontact IC tag (RF-ID tag) in a noncontact manner. The management pallet 30 also includes a sensing unit for acquiring environmental data of temperature, humidity, shock, etc., a mobile antenna for enabling communications such as packet communications with the mobile telephone 70, etc., through the mobile communication network 60, and a GPS for acquiring position information from the GPS satellite 10.

In the state shown in the figure, the management pallet 30 is installed in a warehouse and an intra-warehouse position transmission tag 5 is provided in the installation location for each partition. The intra-warehouse position transmission tag 5 is a noncontact IC tag for storing the data indicating the partition and the data can be read through the IC tag reader/writer contained in the management pallet 30.

The mobile communication network 60 is a communication network provided by the carrier of the mobile telephone 70 for allowing the user to view a Web page and transmit and receive electronic mail using the mobile telephone 70.

The mobile communication network 60 is also connected to the Internet (switched line) not shown in the figure and allows communications not only with an apparatus having the same mobile antenna as the mobile telephone 70 (the mobile telephone 70, a data communication card, etc.), but also with an information processing apparatus such as a personal computer connected to the Internet.

The mobile telephone 70 is a mobile information terminal including a data communication function for enabling the user to view a Web page through the mobile communication network 60 and can access the management pallet 30 through the mobile communication network 60.

The charging server 75 is a server for charging for the mobile telephone 70 to access the management pallet 30 through the mobile communication network 60, and charges for accessing Web content that can be used with the mobile telephone 70.

The charging server 75 charges for accessing the management pallet 30 like accessing a chargeable home page for a mobile telephone, and enables the user to select a charging system of a flat sum system on a monthly basis or a variable fee system responsive to the number of access times.

According to the described system configuration, the management pallet 30 can acquire various pieces of data and the data can be accessed, etc., by the mobile telephone 70.

Next, the configuration of the management pallet 30 will be discussed with a perspective view of FIG. 2, a perspective sectional view of FIG. 3, and a schematic representation of a noncontact communication area of FIG. 4.

The management pallet 30 is a pallet that can be loaded with a large number of articles 51 to be transported and can be transported with the forklift 2 (FIG. 1) and functions as a loading platform and is formed as a shape measuring about 1 meter square as the plan view and having a predetermined thickness (for example, about 10 cm).

One noncontact IC tag 55 is put on one article 51 so that the articles 51 are in a one-to-one correspondence with the noncontact IC tags 55. Therefore, as many noncontact IC tags 55 as the number of the articles 51 exist.

For example, a plurality of commodities may be packaged in predetermined units of dozens, etc., and one noncontact IC tag 55 may be put on one package as one article for use. In this case, it is advisable to also store data of the number of commodities in the noncontact IC tag 55.

The management pallet 30 is formed on each side with two fork holes 31 penetrating the inside to the opposite side so as to allow a fork 2a (FIG. 1) of the forklift 2 (FIG. 1) to be inserted thereinto. Accordingly, the fork 2a of the forklift 2 can be inserted from any of the four sides for lifting up and transporting the management pallet 30.

The management pallet 30 is formed of a hard resin member. It may be formed of any other material that can support the placed articles 51, such as wood.

A battery 38 can be detachably placed in one corner of the management pallet 30. The battery 38 is thus detachably placed in the surrounding part of the management pallet 30, so that the battery 38 can be detached from the management pallet 30 loaded with a large number of articles 51 and heavy in total weight as it is, and can be easily charged.

A groove is provided in the center of the front of the management pallet 30 provided with the battery 38, and a mobile antenna 33 for conducting wireless long-distance communications with a base station (not shown) of the mobile communication network 60 (FIG. 1) is placed in the groove.

Thus, the mobile antenna 33 is placed in the surrounding part of the management pallet 30 hard to receive the effect of the loaded article 51 and further at a position away from the four corners easy to receive mechanical stress load, so that communications are stabilized and failure is also prevented.

The bottom of the management pallet 30 is covered with an electromagnetic shield material 45 formed of a radio wave blockage material such as a net formed of aluminum foil or metal fiber fully. Accordingly, if multiple management pallets 30 loaded with the articles 51 are piled up, radio interference between the top and bottom management pallets 30 can be prevented.

Therefore, it is made possible for one management pallet 30 to communicate with the noncontact IC tag 55 of the article 51 loaded into the management pallet and not to communicate with the noncontact IC tag 55 of the article 51 loaded into another management pallet 30.

Figure 3:
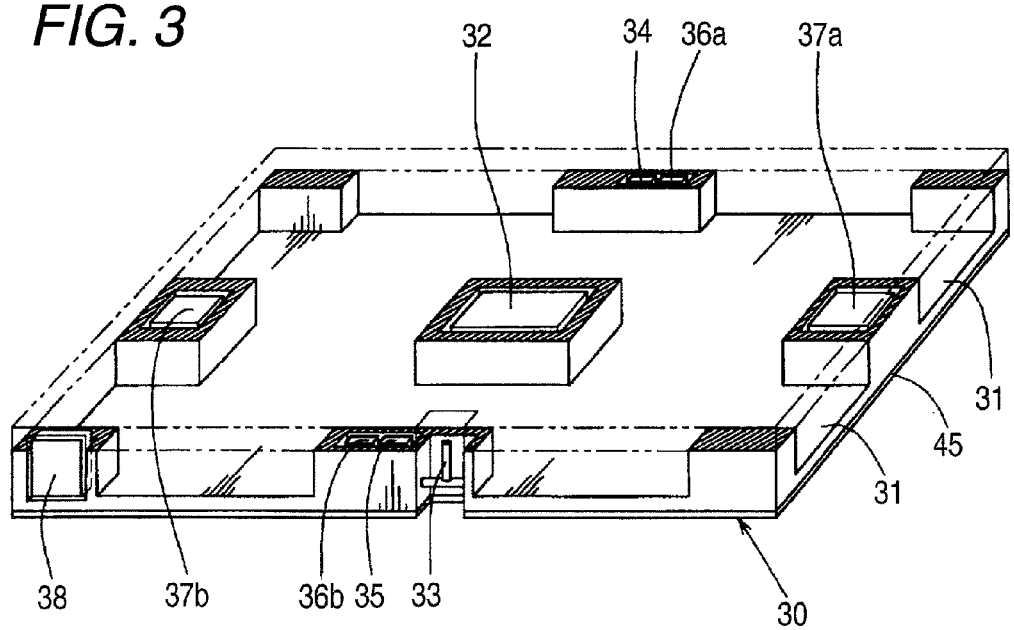
FIG. 3 is a perspective sectional view of the management pallet.

The management pallet 30 contains a controller 32, a GPS 34, a standard frequency broadcast receiver 35, sensing units 36 (a first sensing unit 36*a* and a second sensing unit 36*b*), and IC tag readers/writers 37 (a first IC tag reader/writer 37*a* and a second IC tag reader/writer 37*b*) for communicating with the noncontact IC tag 55 in a noncontact manner, as shown in FIG. 3.

The controller 32 is embedded in the center of the management pallet 30 to avoid strong shock because it has a control circuit. The controller 32 may be housed with a lid opened and closed on a flat face or a bottom of the management pallet 30 so that it can be easily attached to and detached from the management pallet 30. In this case, the controller 32 can be easily taken out and thus it becomes easy to fetch data in the controller 32.

The GPS 34 is placed at the center of the rear of the management pallet 30. The standard frequency broadcast receiver 35 is placed at the center of the front of the management pallet 30.

The GPS 34, the standard frequency broadcast receiver 35, and the mobile antenna 33 are placed the peripheral portions of the management pallet 30 (in the embodiment, the front and the rear), so that the loaded article 51 does not hinder wireless communications and a failure caused by a stress, etc., at the transporting time with the forklift 2 is prevented.

The sensing units 36 (36*a* and 36*b*) are disposed one at the center of the left side of the management pallet 30 and one at the center of the right side. As the sensing units 36 are thus placed, a failure caused by a stress, etc., at the transporting time with the forklift 2 is prevented.

The IC tag readers/writers 37 (37*a* and 37*b*) are disposed one at the center of the left side of the management pallet 30 and one at the center of the right side. As the IC tag readers/writers 37 are thus placed, a failure caused by a stress, etc., at the transporting time with the forklift 2 is prevented.

Figure 4:
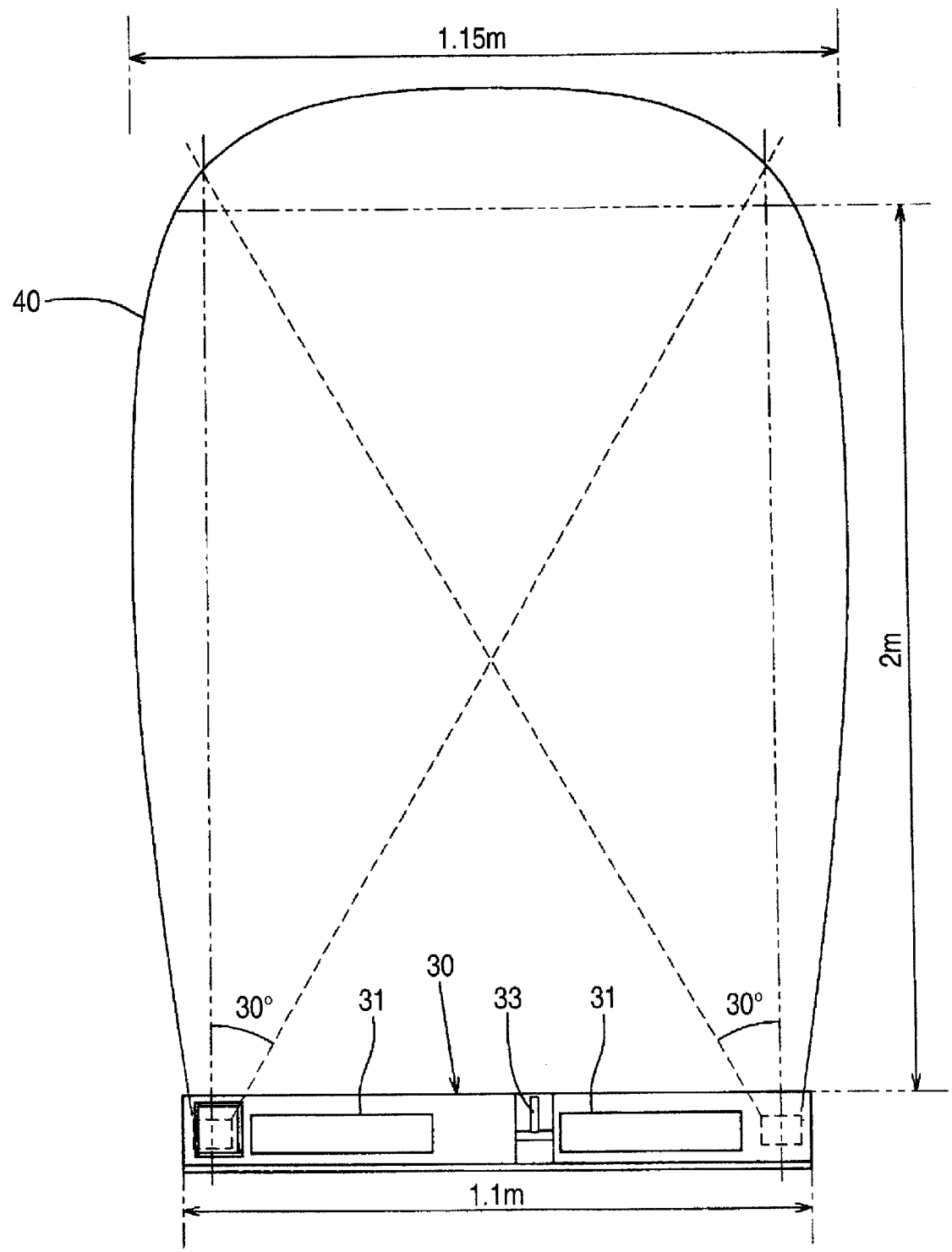
FIG. 4 is a front view to describe a noncontact communication area of the management pallet.

The IC tag readers/writers 37 are provided as left-right symmetry with antenna output adjusted so that the transmission angle is set to about 30.degree. with the transmission direction directed to the inner upper part and the communicatable distance becomes about 2 m at height toward the upper part of the management pallet 30, as shown in the front view of FIG. 4. Accordingly, the IC tag readers/writers 37 communicate with the noncontact IC tag 55 within about 1.15 m around at a height of about 2 m in the upper part of the management pallet 30 measuring about 1.1 meter square.

According to the described configuration, the controller 32, the mobile antenna 33, the GPS 34, the standard frequency broadcast receiver 35, the sensing units 36, and the IC tag readers/writers 37 can be incorporated in the management pallet 30.

Since the incorporated components are disposed circumventing the top and bottom (particularly, top) positions of each fork hole 31 of the management pallet 30, if the fork 2*a* of the forklift 2 is inserted into the fork holes 31 and the management pallet 30 is lifted up together with the loaded articles 51, the components are not broken.

Reliable communications can be conducted with the noncontact IC tag 55 put on the loaded article 51 in a predetermined range (specifically, upper 2 m and within 1.15 m around) in the upper part of the management pallet 30.

Since a communication area 40 is set so as not to widen to any side of the management pallet 30, if a plurality of management pallet s 30 are placed side by side, reliable communications can be conducted only with the noncontact IC tag 55 put on the article 51 on the home management pallet 30.

Since the upper part of the management pallet 30 is set to about 2 m, the range in which articles can be loaded into the management pallet 30 can be covered and communications can be conducted with the noncontact IC tags 55 of all articles 51 loaded to such an extent that a load shift does not occur. Areas where communications cannot be conducted in the proximity of the management pallet 30 can be lessened.

Figure 5:
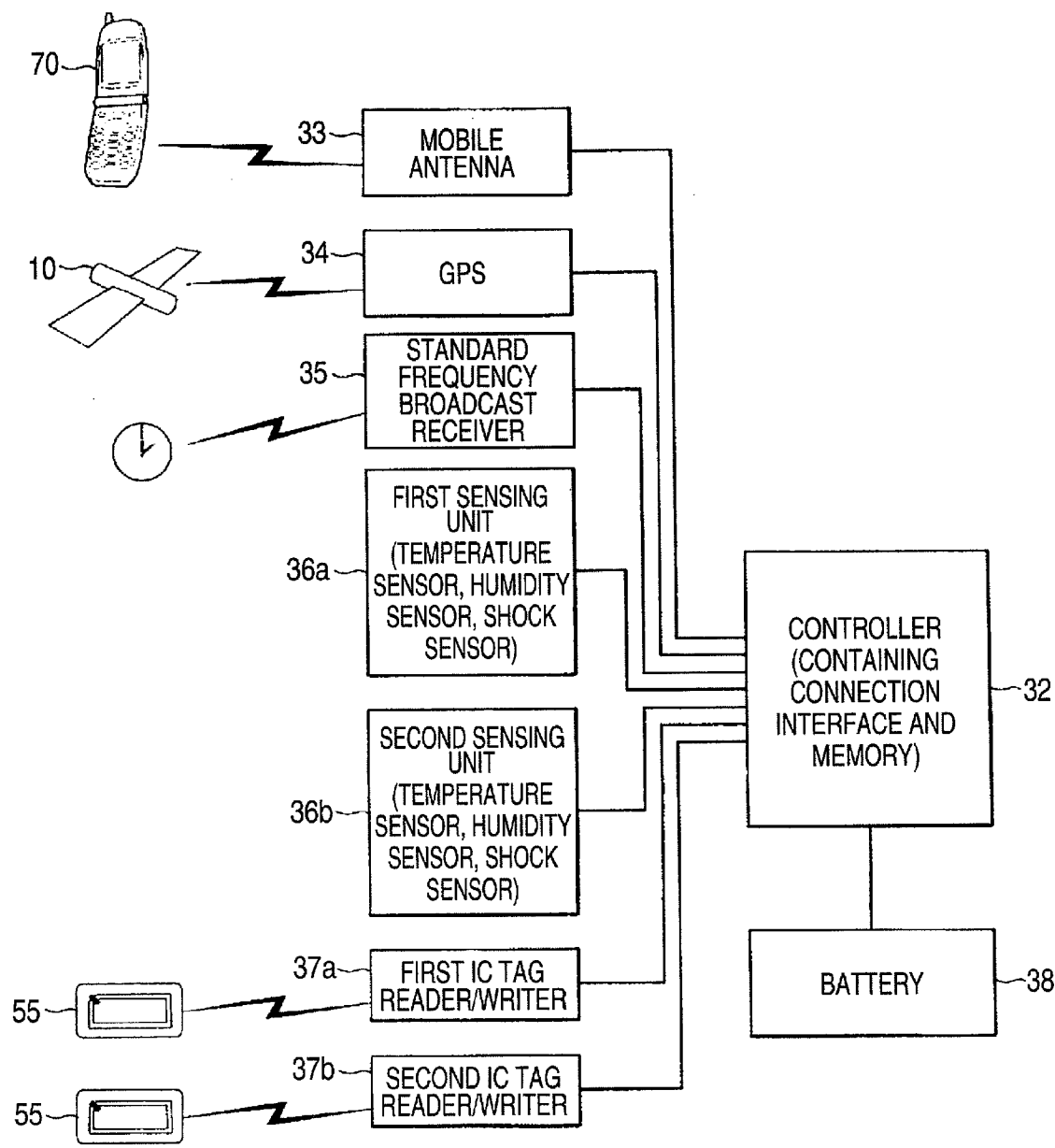
FIG. 5 is a block diagram of the management pallet.

Next, the configuration of the management pallet 30 will be discussed with a block diagram of FIG. 5.

The management pallet includes the mobile antenna 33, the GPS 34, the standard frequency broadcast receiver 35, the first sensing unit 36*a*, the second sensing unit 36*b*, the first IC tag reader/writer 37*a*, and the second IC tag reader/writer 37*b*, which are connected to the controller 32, and also includes the battery 38 as a drive power supply.

The controller 32 contains nonvolatile memory and controls the components and also retains data in the nonvolatile memory. Data of the serial number, the owner, the user, the use start date, the use end scheduled date, etc., of the management pallet 30 is written into the nonvolatile memory as initial data. When the management pallet 30 is passed to the user, any other unnecessary data is previously erased.

The controller 32 also includes a connection interface of a LAN, a USB, etc., so that communications can be conducted with the storage server 20 through the connection interface.

The connection interface may be a wired interface of may be a wireless interface. To provide a wireless interface, it is desirable that it should be set to a frequency different from the communication frequency of the mobile antenna 33 or the communication frequency of the IC tag reader/writer 37.

The controller 32 also includes a Web server function and can be accessed through the mobile antenna 33 from the mobile telephone 70 as a home page is viewed on the mobile telephone 70.

The controller 32 is accessed from the mobile telephone 70 based on the mobile telephone number set in the controller 32 of the management pallet 30, but may be made accessible using ID and a password.

The mobile antenna 33 communicates with a base station (not shown) using a 800 MHz to 2 GHz band as communication frequencies for communicating with the mobile telephone 70 through the mobile communication network 60 (FIG. 1) under the control of the controller 32. It is desirable that the communication frequency should be set to 1 GHz or more to prevent interference with the IC tag reader/writer 37 described later.

The GPS 34 includes a GPS antenna and communicates with the GPS satellite 10 to acquire position information under the control of the controller 32. The standard frequency broadcast receiver 35 receives standard frequency broadcast for acquiring time information under the control of the controller 32.

The first sensing unit 36a and the second sensing unit 36b are each made up of a temperature sensor, a humidity sensor, and a shock sensor. The temperature measured with the temperature sensor and the humidity measured with the humidity sensor are transmitted to the controller 32 in accordance with a control signal from the controller 32. If the management pallet 30 receives shock of vibration or collision, the shock sensor detects the shock and transmits it to the controller 32.

The first IC tag reader/writer 37a and the second IC tag reader/writer 37b include each an IC and an antenna coil (not shown). A tag ID (ID unique for each noncontact IC tag 55 is initially recorded in nonvolatile memory in the IC and further data of the type, the manufacturing date, the manufacturer, etc., of each article is recorded in the nonvolatile memory before the article is sent to a physical distribution step.

Together with the data, either or both of the position data acquired in the GPS 34 and the time data acquired in the standard frequency broadcast receiver 35 may be recorded before the article is sent to the physical distribution step. In this case, the time and the position just before the article is sent to the physical distribution step can be recorded.

Data is written into and is read from the noncontact IC tag 55 at the communication frequency of the UHF band of 850 MHz to 960 MHz in accordance with a control signal from the controller 32, and the read data is transmitted to the controller 32. Likewise, the data indicating the partition is read from the intra warehouse position transmission tag 5 and the read data is transmitted to the controller 32.

As the communication frequency, general frequency 13.56 MHz can also be used. However, usually articles are often stacked to a height of about 2 m and thus preferably the communication frequency of the UHF band is used to communicate with the noncontact IC tag in the range of the height 2 m from the IC tag reader/writer 37.

The noncontact IC tag 55 includes an antenna coil, a parallel resonance circuit made up of capacitor for resonance with the antenna coil, a rectification circuit, a voltage detection circuit, a control circuit, and a constant voltage circuit.

The described noncontact IC tag 55 receives a command from the IC tag reader/writer 37 through the antenna coil, performs processing based on the command by the control circuit, and again responds to the IC tag reader/writer 37 through the antenna coil.

The battery 38 is a rechargeable power supply device and charges with sufficient electrical quantity for the management pallet 30 to operate for use days when the management pallet 30 is passed to the user.

According to the described configuration, communications with the mobile telephone 70, communications with the GPS satellite 10, reception of the standard frequency broadcast, communications with the noncontact IC tag 55, and acquisition of temperature, humidity, and shock by the sensing units 36 can be executed under the control of the controller 32, and the data can be retained in the memory of the controller 32.

To access a plurality of noncontact IC tags 55 on the management pallet 30 by the IC tag reader/writer 37, it is advisable to perform multiple tag access processing generally called anticollision.

Figure 6:
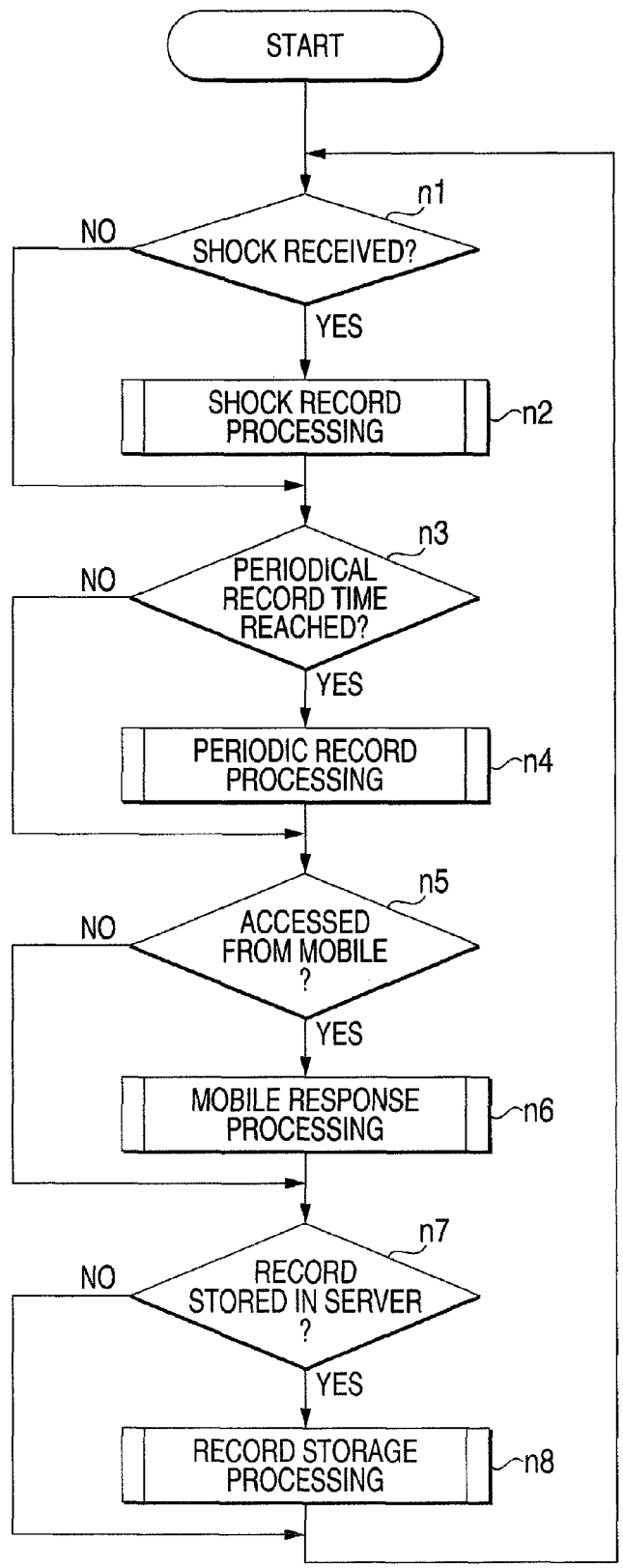
FIG. 6 is a flowchart of general processing executed by a controller of the management pallet.

Next, the general processing executed by the controller 32 of the management pallet 30 will be discussed with a flowchart of FIG. 6.

If the management pallet 30 receives shock of vibration, collision, or drop (step n1), the controller 32 executes shock record processing described later (step n2).

If the standard time received in the standard frequency broadcast receiver 35 reaches a predetermined periodical record time (step n3), the controller 32 executes periodic record processing described later (step n4).

If the management pallet 30 is accessed at the mobile antenna 33 from the mobile telephone 70 (step n5), the controller 32 executes mobile response processing described later (step n6).

If the storage server 20 is connected to the connection interface of the controller 32 and a storage command for storing a record is received (step n7), the controller 32 executes record storage processing described later (step n8) and terminates the processing.

The storage command can be executed appropriately when a command signal is received from the connected storage server 20, when a switch provided as required is pressed, or when a command signal is received from the mobile telephone 70 through the mobile antenna 33.

As the described operation is performed, necessary processing can be performed when a predetermined operation condition of shock, periodic record time, access from the mobile telephone 70, reception of a storage command from the storage server 20, etc., is reached.

Figure 7:
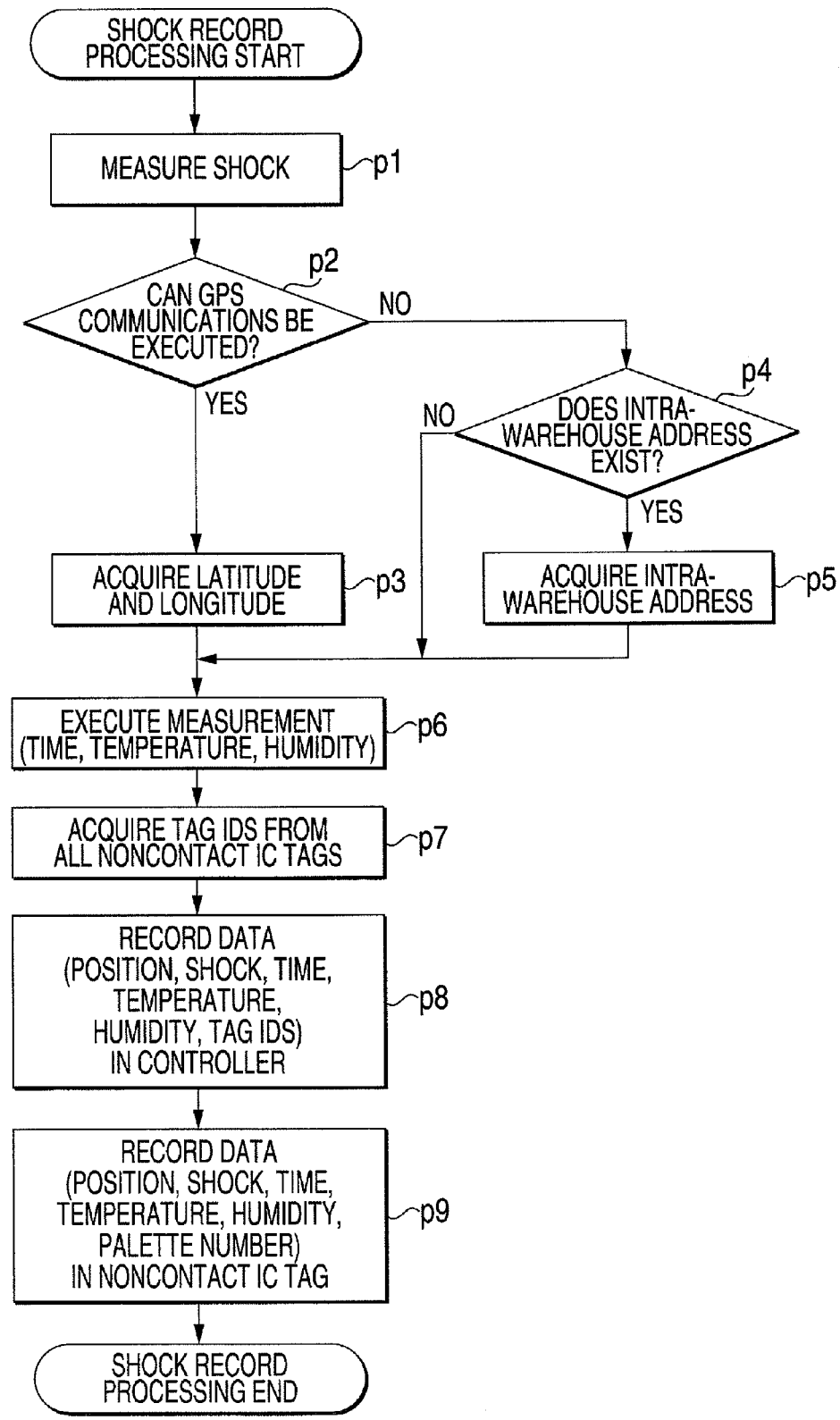
FIG. 7 is a flowchart of shock record processing executed by the controller.

Next, the shock record processing executed by the controller 32 will be discussed with a flowchart of FIG. 7.

If the controller 32 detects shock by the shock sensor of the sensing unit 36, the shock is measured (step p1).

If the GPS 34 can communicate with the GPS satellite 10 (YES at step p2), latitude and longitude are acquired as position information (step p3).

If the GPS 34 cannot communicate with the GPS satellite 10 (NO at step p2), an attempt is made to communicate with the intra-warehouse position transmission tag 5 by the IC tag reader/writer 37 and whether or not intra-house address, namely, partition data exists in the communication area is determined (step p4).

If intra-house address exists (YES at step p4), the intra-house address is acquired as position information (step p5) and the process is advanced to step p6. If no intra-house address exists (NO at step p4), the process is advanced to step p6 in a state in which position information cannot be acquired.

The controller 32 executes measurement and executes acquisition of the current time (days, hours, minutes) by the standard frequency broadcast receiver 35, acquisition of the current temperature by the temperature sensor of the sensing unit 36, and acquisition of the current humidity by the humidity sensor (step p6).

The controller 32 acquires the tag IDs (the serial numbers of the noncontact IC tags 55) from all noncontact IC tags 55 placed on the home management pallet 30 (step p7). The controller 32 records all acquired tag IDs and the position, the shock, and the time in the memory in the controller 32 (step p8).

The controller 32 records the position, the shock, the time, the temperature, the humidity, and the pallet number in the noncontact IC tag 55 (step p9) and terminates the processing.

The pallet number is stored in the memory in the controller 32.

As the described operation is performed, if the shock sensor of the sensing unit 36 of the management pallet 30 detects shock, the shock can be recorded in the noncontact IC tag 55 and the memory of the controller 32. Therefore, the recipient of the article 51 can read the data from the noncontact IC tag 55 and can check the presence or absence of shock and can collate with the data in the memory of the controller 32 to check whether or not the data concerning shock is tampered with.

Figure 8:
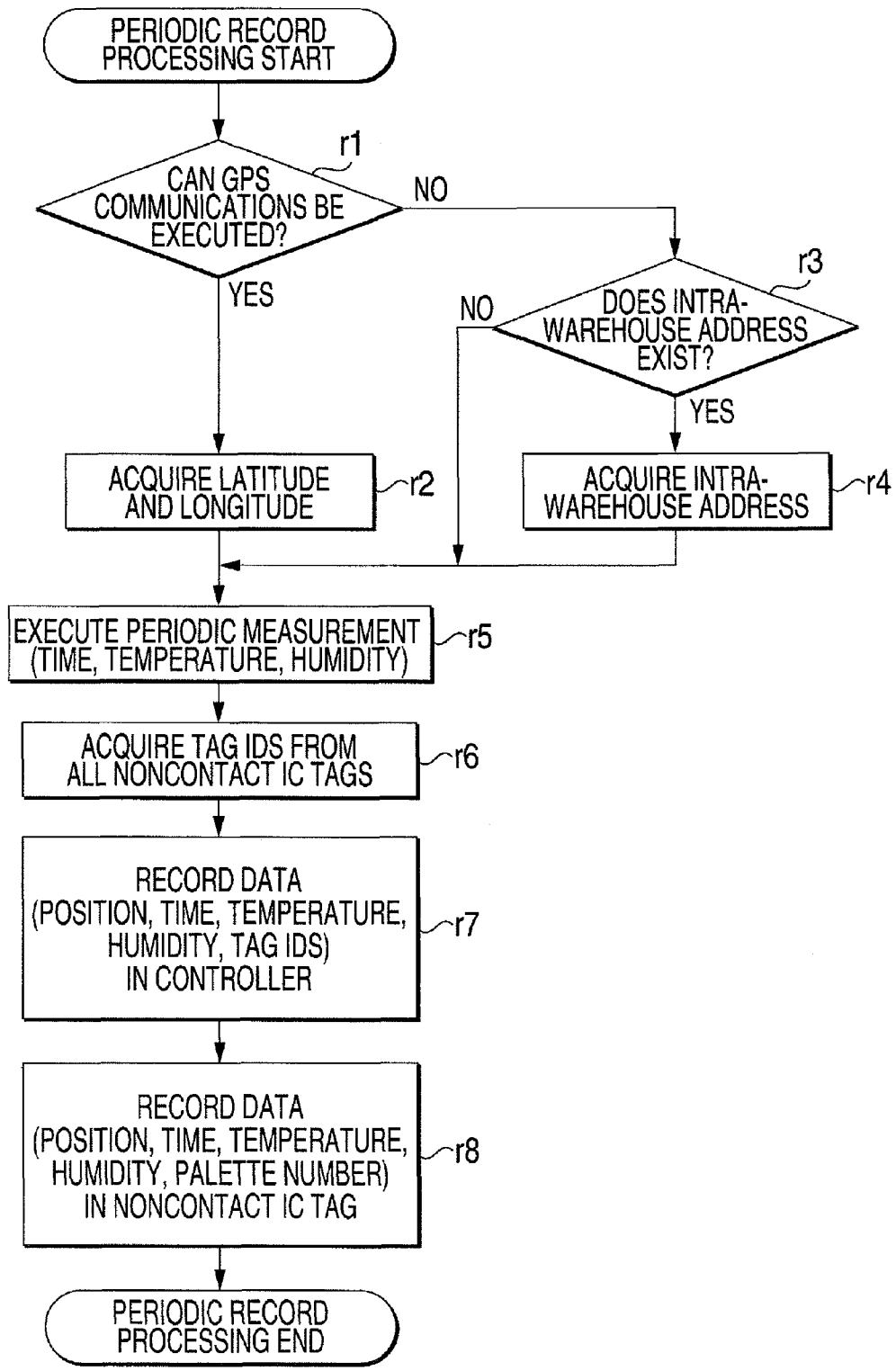
FIG. 8 is a flowchart of periodic record processing executed by the controller.

Next, the periodic record processing executed by the controller 32 will be discussed with a flowchart of FIG. 8.

In the periodic record processing, the same processing as steps p2 to p9 of the shock record processing described above except step r7, r8 is executed as steps r1 to r8.

At step r7, data other than shock, recorded in the shock record processing, namely, the position, the time, the temperature, the humidity, and the tag ID are recorded as the data stored in the memory of the controller 32.

At step r8, data other than shock, recorded in the shock record processing, namely, the position, the time, the temperature, the humidity, and the pallet number are recorded as the data stored in the noncontact IC tag 55.

As the described operation is performed, the position, the temperature, and the humidity can be recorded in the noncontact IC tag 55 and the controller 32 with the time on a regular basis. Therefore, the progress of the transport situation of each article 51 loaded into the management pallet 30 can be recorded and whether or not each article has been passed through the normal physical distribution route and has undergone appropriate temperature management and humidity management can be checked later.

If the data written into the noncontact IC tag 55 is read, the consignee can check the management state of physical distribution and the physical distribution route and can collate with the controller 32 to prevent tampering.

The intervals of periodic record may be set to time intervals responsive to the management condition required for the transported article 51 in units of 10 minutes, 30 minutes, one hour, etc.

Figure 9:
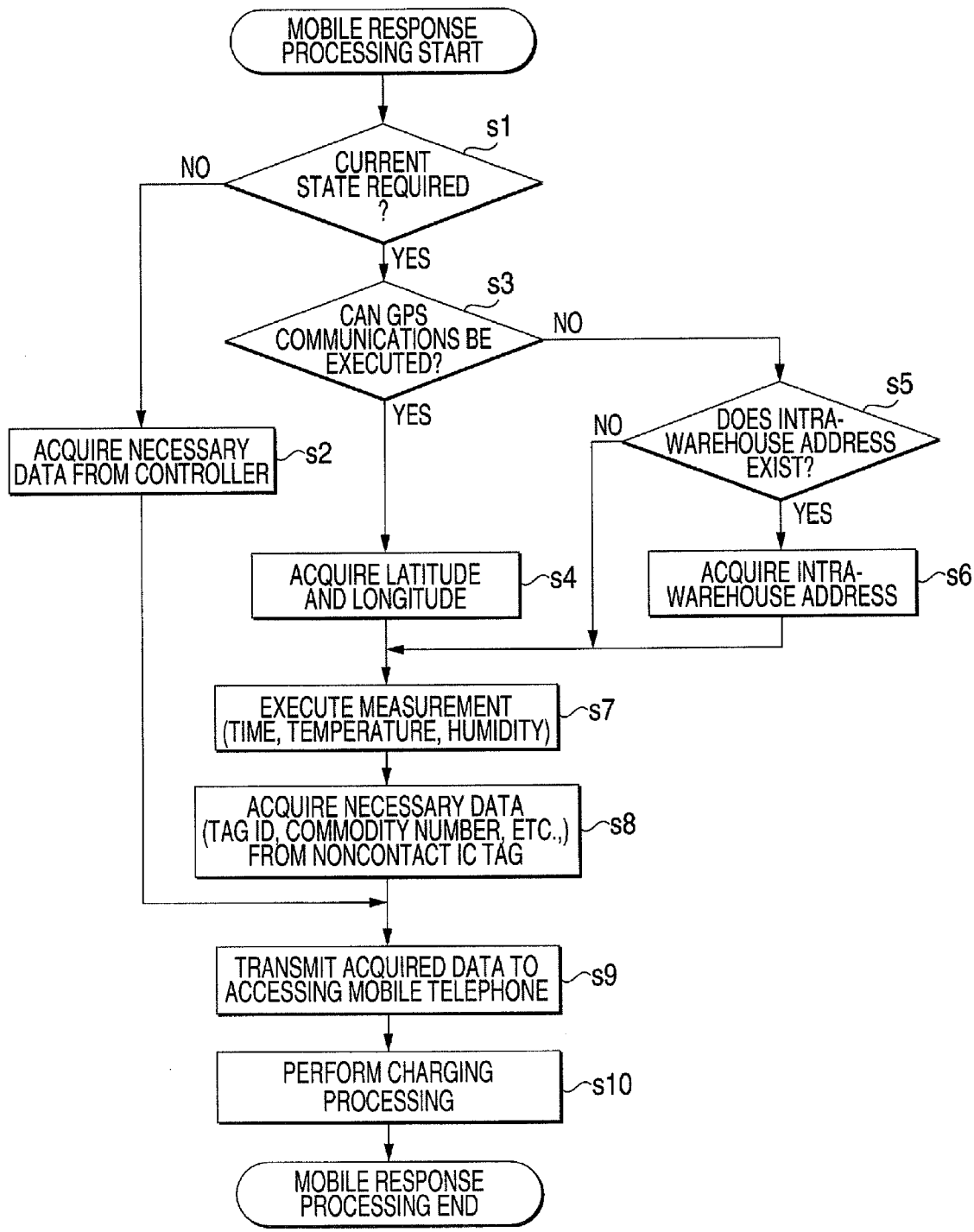
FIG. 9 is a flowchart of mobile response processing executed by the controller.

Next, the mobile response processing executed by the controller 32 will be discussed with a flowchart of FIG. 9.

If the access description from the mobile telephone 70 does not require the current state of affairs at this point in time (NO at step s1), the controller 32 acquires necessary data (tag ID, commodity name, number of articles, position, presence or absence of shock, temperature state, humidity state, etc., required by the mobile telephone 70) from the memory (step s2) and advances the process to step s9.

If the current state of affairs at this point in time is required (YES at step s1), steps s3 to s7 are executed as the same processing as steps p2 to p6 of the shock record processing described above (steps s3 to s7).

The controller 32 reads necessary data (tag ID, commodity name, number of articles, etc., required) from the noncontact IC tag 55 (step s8).

When the necessary data can be acquired, the acquired data is transmitted to the accessing mobile telephone 70 (step s9), the mobile telephone number of the mobile telephone 70 is transmitted to the charging server 75 as data required for charging (step s10), and the processing is terminated.

As the described operation is performed, the user can access the management pallet 30 using the mobile telephone 70 for acquiring information concerning the loaded articles 51 and information of the current position, etc.

Generally, a pallet loaded with articles for transporting the articles tends to be lost and once the pallet is lost, where the pallet is distributed in the physical distributed process becomes unknown. However, if the management pallet 30 is accessed from the mobile telephone 70 for acquiring position information, it is made possible to determine the current position to find the lost pallet.

Since the user can acquire necessary data from a remote location, the user can check the current article 51 being transported at present is transported to what point and whether or not the article undergoes normal temperature management at once at any times and anywhere.

When the management pallet 30 is accessed, the charging server 75 charges for accessing the management pallet 30, so that the bill can be collected as the management pallet 30 is provided.

Figure 10:
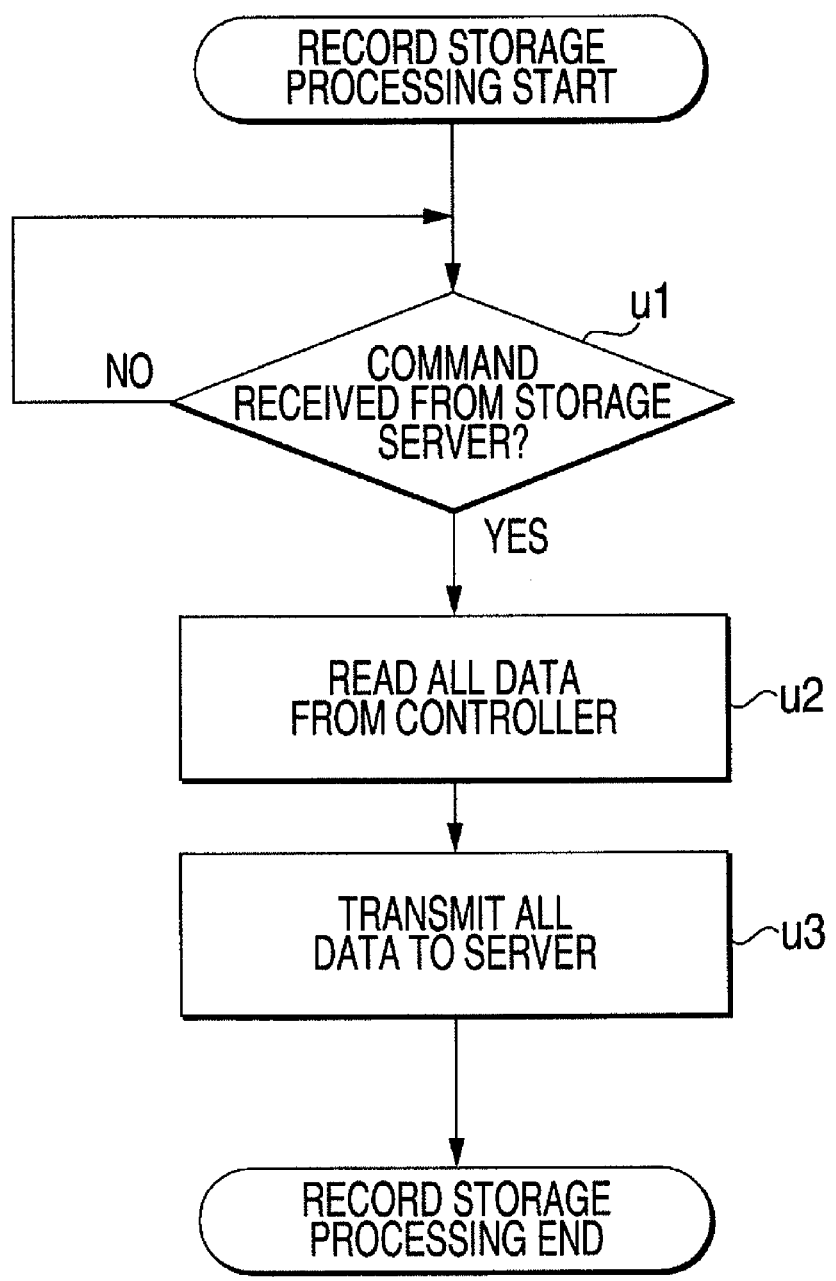
FIG. 10 is a flowchart of record storage processing executed by the controller.

Next, the record storage processing executed by the controller 32 will be discussed with a flowchart of FIG. 10.

The controller 32 waits until reception of a transfer command based on a data transfer signal from the storage server 20 and if the controller receives a transfer command (step u1), it reads all data from the internal memory (step u2).

The controller 32 transmits all read data (position, time, temperature, humidity, shock, and tag ID) to the storage server 20 (step u3).

As the described operation is performed, all data can be transmitted to the storage server 20. If data of a plurality of management pallets 30 is transferred to the storage server 20, it can be used for physical distribution management.

The data can be used for collective management of the past records and thus can be effectively utilized not only for the physical distribution management, but also for guaranteeing of the physical distribution state, improvement in the physical distribution process, exhaust monitor of waste, traceability, etc.

The data transferred to the storage server 20 may be left as it is in the management pallet 30; preferably, however, the data is deleted at the transfer time. Accordingly, duplication of data resulting from transferring data more than once can be prevented.

The operation described above is all performed, whereby data having entries (fields) of position, time, temperature, humidity, vibration, and pallet number can be additionally recorded on the noncontact IC tag 55 in time sequence as a physical distribution history and can be retained, as shown in a data schematic representation of FIG. 11.

Therefore, the consignee of the article 51 can know the actual physical distribution process simply by reading the data of the noncontact IC tag 55 put on the article 51 (or the noncontact IC tag 55 associated with the article 51 by inner packaging or attachment).

What can be seen from the data of the noncontact IC tag 55 will be specifically discussed. In the example shown in the figure, the producer and the transport trader can be identified from information of latitude and longitude shown in record Nos. 1 to 8.

It is seen that the article was placed at room temperature (+25.degree. C.) in the beginning as shown in record No. 1 and then was transported while the article was stored at a temperature of −10.degree. C. for a given time period in record Nos. 4 to 6.

It is seen that the article was stored in a warehouse for a given time according to the intra-warehouse address in record Nos. 4 to 6. At this time, the pallet number changes in record No. 4 and therefore it is seen that the article was transshipped from one management pallet 30 to another management pallet 30.

It is seen in record No. 6 that the article underwent shock and it is also seen that the temperature rose to +10.degree. C. Last, it is seen in record No. 8 that the article was transshipped to the former management pallet 30 and was placed at room temperature (+30.degree. C.).

Data having entries (fields) of position, time, temperature, humidity, shock, and tag ID can be additionally recorded in the memory of the controller 32 in time sequence as a physical distribution history and can be retained, as shown in a data schematic representation of FIG. 12.

Therefore, if the data recorded on the noncontact IC tag 55 is tampered with, the data can be compared with the data in the controller 32 for detecting the tampering.

What can be seen from the data in the controller 32 will be specifically discussed. In the example shown in the figure, the producer and the transport trader can be identified from information of latitude and longitude shown in record Nos. 1 to 9. It is seen in record No. 1 that the article was placed at room temperature (+25.degree. C.) in the beginning and then was transported while the article was stored at a temperature of −10.degree. C. for a given time period in record Nos. 2 to 8.

According to record No. 3, the fact that the pallet was accessed from a mobile telephone and the position (latitude and longitude) and the time at the access time are left as evidence and thus it is seen that the pallet was accessed from a mobile telephone.

As shown in record Nos. 5 to 8, the intra-warehouse address is recorded at a place where radio waves of GPS are hard to reach and thus it is seen that the article was stored in the warehouse. At this time, the number of tag IDs decreases in record No. 5 and thus it is seen that the article 51 on which the noncontact IC tag 55 of the lost tag ID was put was removed (unloaded) from the management pallet 30.

The number of tag IDs increases in record No. 7 and the additional tag ID did not exist so far and thus it is seen that a new article 51 was loaded. Accordingly, if articles are loaded in a mixed manner, they can be managed appropriately.

Since the latitude and the longitude are again recorded in record No. 9, it is seen that the article was shipped from the warehouse and was placed in the room temperature state. At this time, one of the recorded tag IDs changes to "AB-CDE" and thus it is seen that the loaded article 51 was again transshipped at the point in time.

Figure 13:
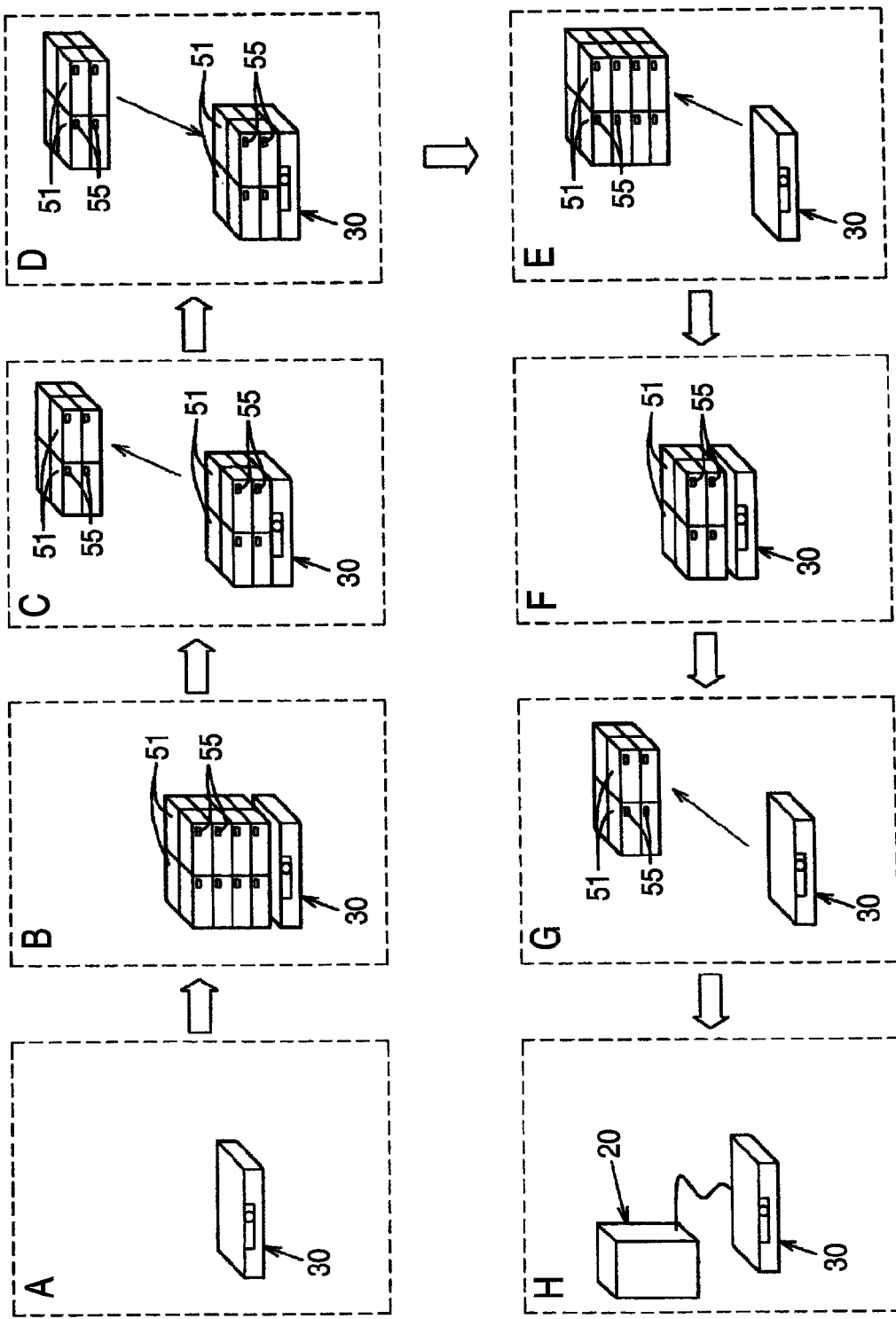
FIG. 13 is a schematic representation of a physical distribution process.

The data is thus recorded at each point in time, so that loading and unloading of each article 51 into and from the management pallet 30 can be monitored as shown in A to H in a data schematic representation of a physical distribution process of FIG. 13 and last the data can be transmitted to the storage server 20 as shown in H.

Such data in the controller 32 can be acquired if the management pallet 30 is accessed from the mobile telephone 70 through the mobile communication network 60. Thus, so long as data is left in the management pallet 30, if the article 51 is unloaded and the management pallet 30 is already moved to another place, collation for detecting tampering of data recorded in the noncontact IC tag 55 is made possible.

If data is already transferred to the storage server 20 and is not left in the management pallet 30, if the storage server 20 is accessed from an appropriate terminal through a communication line of the Internet, etc., collation for detecting tampering of data recorded in the noncontact IC tag 55 is made possible.

Thus, communications can be conducted with the noncontact IC tags 55 put on all articles 51 on the management pallet 30, so that the storage state of removal and mixed loading of the articles 51 on the management pallet 30 in the physical distribution process can be grasped in detail.

If the user at each physical distribution site or the user such as the transport trader does not have a reader/writer that can communicate with the noncontact IC tag 55, communications with the noncontact IC tag 55 can be conducted using the management pallet 30, so that physical distribution management using the noncontact IC tag 55 that can be used at low cost can be promoted.

Since electronic equipment is disposed in the management pallet 30 circumventing the fork holes 31, a failure caused by use can be prevented and long-term use can be made.

Removal and addition of each article 51 from and to the management pallet 30 are automatically recorded in the memory in the controller 32, so that manual work mistakes, etc., can be prevented and reliability of management can be enhanced.

If the articles 51 are transported entirely using a plurality of management pallets 30, the current information and the physical distribution history of all articles 51 can be acquired regardless of how the articles 51 are sorted, are loaded in a mixed manner, etc.

Location management of the article 51 in a wide range and detailed storage state management of the article 51 are possible regardless of whether the management pallet 30 exists inside or outside a warehouse, etc.

The passage of position move in a wide range using GPS can be recorded and the passage of the temperature and the humidity during transporting or during storage can also be recorded. Thus, by far detailed management and certification of the physical distribution process can be conducted as compared with a former mode in which management is only conducted when articles are stocked in or left from a warehouse.

Since the management pallet 30 provided with the IC tag reader/writer 37 is distributed, an IC tag reader/writer need not be provided at each physical distribution site and investment of an IC tag reader/writer becomes unnecessary.

Since access to the management pallet 30 and access to the noncontact IC tag 55 with the management pallet 30 controlled can be made using the mobile telephone 70, the physical distribution sites need not be connected by a network for using the system. Therefore, the system can be used without equipment investment of network connection or equipment investment concerning ensuring of security.

Since it is not necessary to pass the article 51 through conveyor type readers or gate type readers unlike the related art, the carrying-in and carrying-out paths are not limited and freight can be prevented from being tied up.

The management pallet 30 can be accessed at any time using the mobile telephone 70 and can be remotely controlled for acquiring data of the current position, temperature, humidity, and shock, so that the user can always keep track of the current state of the article 51 easily.

The consignee can easily check whether or not all ordered articles 51 are loaded into the management pallet 30 by communicating with the noncontact IC tags 55 using the IC tag reader/writer 37 of the management pallet 30 in a state in which the articles 51 are loaded into the management pallet 30.

Since it is difficult to change the data in the memory of the controller 32, the data written into the noncontact IC tags 55 with the IC tag reader/writer 37 under the control of the controller 32 becomes highly reliable.

Since the data in the memory of the controller 32 and the data in the IC tag reader/writer 37 completely match, if the data in the IC tag reader/writer 37 is tampered with, the tampering can be found by collation with the data in the memory of the controller 32.

Data is copied into and stored in the storage server 20 at the last point in time of the physical distribution process, whereby management of the physical distribution process, guaranteeing of the transport route physical distribution state, improvement in the physical distribution process, and exhaust monitor of waste can be conducted.

Packing material etc., exists as waste, which is automatically recorded in the memory of the controller 32, whereby it can be used as resource management data of the sender or can be used as record data of the waste type and amount by a waste trader.

Since the position of the management pallet 30 can be tracked, if the management pallet 30 is lost, the management pallet 30 is accessed from the mobile telephone 70 for causing the GPS 34 to acquire position data and return the acquired position data, whereby the user can keep track of the position of the management pallet 30.

If the periods of use of the management pallet 30 are left, the management pallet 30 can be used as it is and thus can also be used separately in a plurality of physical distribution processes in such a manner that the management pallet 30 is used in the physical distribution process of return for the consignee to return the article 51 or package material.

In the embodiment described above, two or more IC tag readers/writers 37 may be installed in such a manner that a total of four are provided each for each side, for example, in the surrounding portion of the management pallet 30. Accordingly, the communicatable area can be set in more detail. In this case, it is advisable to place the GPS 34 and the sensing unit 36 in the remaining space.

Figure 14:
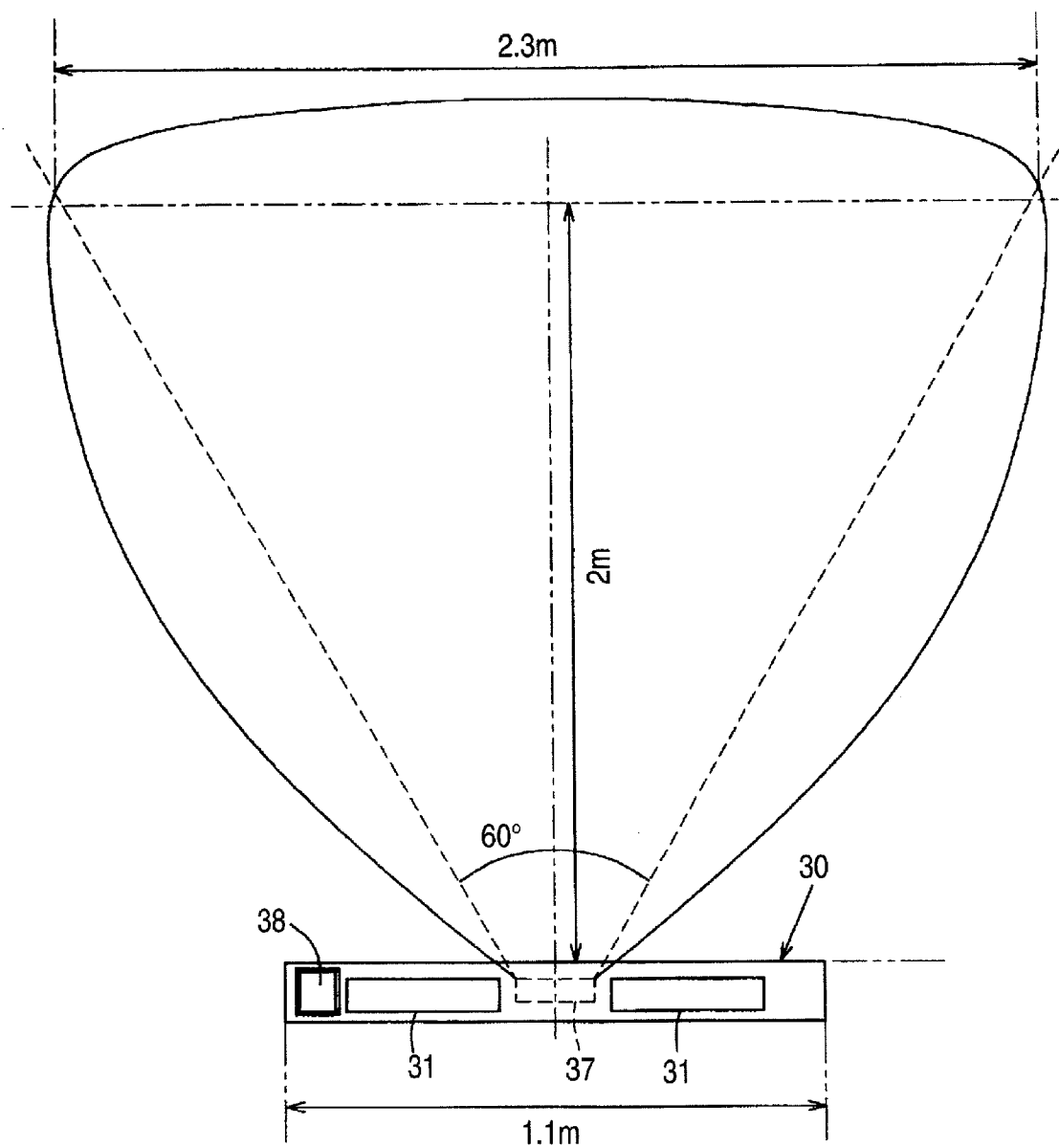
FIG. 14 is a front view to describe a noncontact communication area of a management pallet of another embodiment.

One IC tag reader/writer 37 may be installed in the center portion of the plan view of the management pallet 30 as shown in a front view of FIG. 14 to describe a noncontact communication area.

In this case, it is advisable to set the transmission angle of the IC tag reader/writer 37 to 60.degree. with the transmission direction directed to the vertical upper part and adjust the antenna output so that the communicatable distance becomes about 2 m at height toward the upper part of the management pallet 30.

Accordingly, the communicatable area width becomes 2.3 m and the communicatable area becomes larger by 0.6 m to the side of the management pallet 30 than the dimensions of the management pallet 30 measuring 1.1 meter square.

In this case, if the management pallets 30 are made adjacent to each other, a problem of reading the noncontact IC tag 55 on the adjacent management pallet 30 also occurs; however, if the management pallets 30 are prevented from being adjacent or if the full face of the surrounding is covered with an electromagnetic shield material 45 in a state in which the article 51 is loaded, the management pallets 30 can be used with no problem.

At this time, it is advisable to use a film formed of a radio wave blockage material such as a net formed of aluminum foil or metal fiber as the electromagnetic shield material 45.

The mobile antenna 33 may be configured so as to communicate with a wireless LAN that can conduct long-distance communications in a 5-GHz band. In this case, it is advisable to use the Internet in place of the mobile communication network 60. Accordingly, the communication cost can be reduced.

The controller 32 may be accessed from any other external terminal such as a personal computer rather than the mobile telephone 70.

Waterproofing may be applied to the components of the management pallet 30. Accordingly, if the pallet is exposed to rain, etc., in a state in which it is not loaded with any article, a failure can be prevented.

Figure 2:
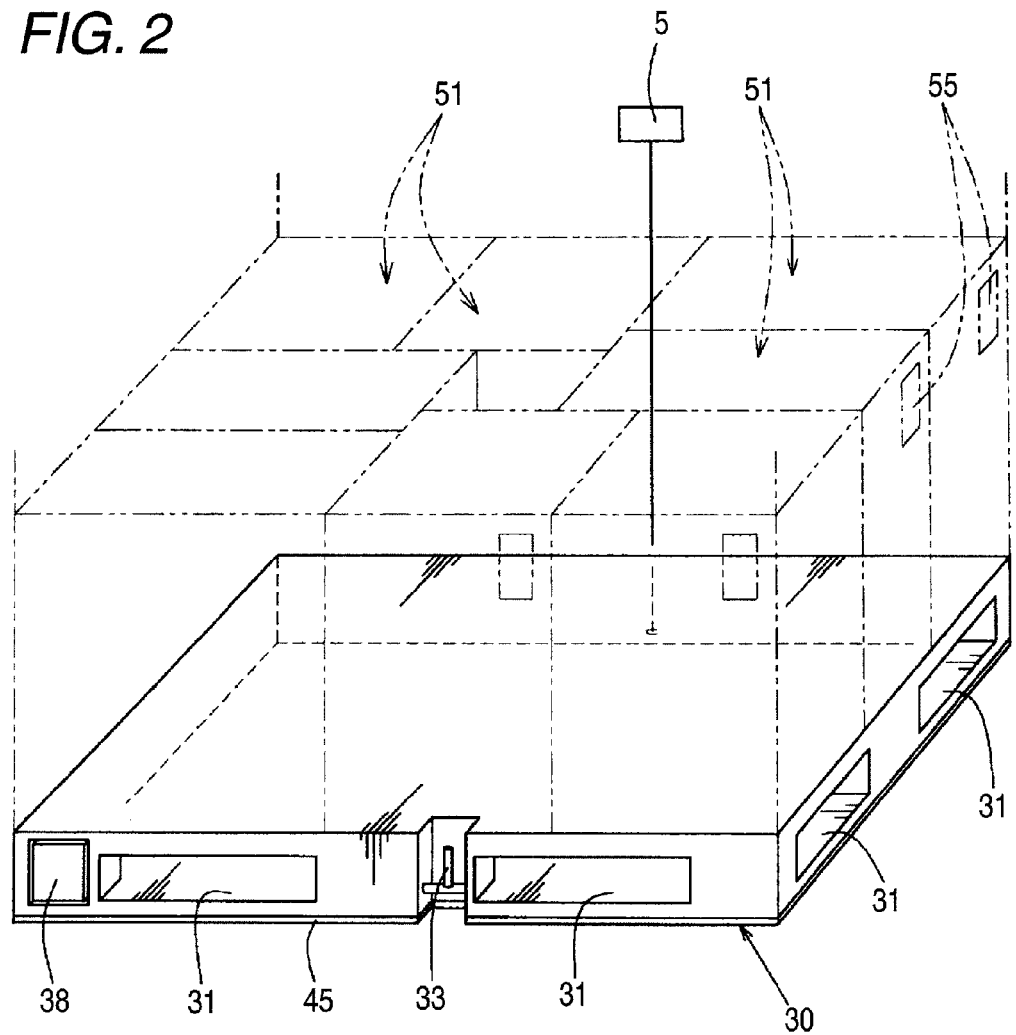
FIG. 2 is a perspective view of a management pallet.
Figure 15:
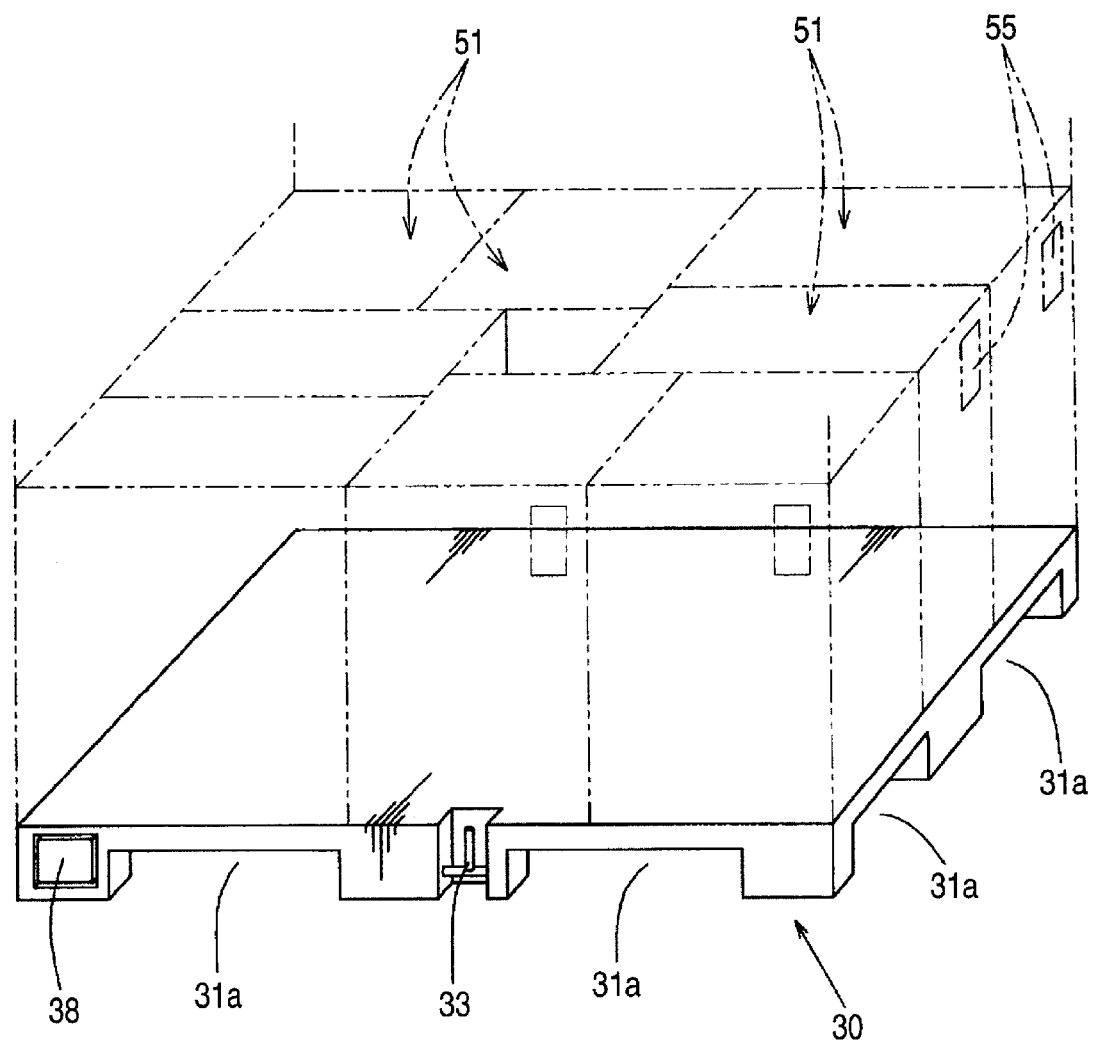
FIG. 15 is a perspective view to show the shape of a management pallet of another embodiment.

The management pallet 30 may be formed as shown in a perspective view of FIG. 15 by removing the bottom portion from the shape shown in FIG. 2.

In this case, fork grooves 31*a* into which the fork 2*a* can be inserted are provided corresponding to the fork holes 31 described above (FIG. 2). It is advisable to place the components in the same manner as the components of the management pallet 30 described above in FIG. 2 are placed.

If the management pallet is thus formed, it has the function as a pallet for transporting articles, the communication function with the noncontact IC tag 55, the communication function with the mobile telephone 70, and other functions and can be used conveniently.

Figure 16:
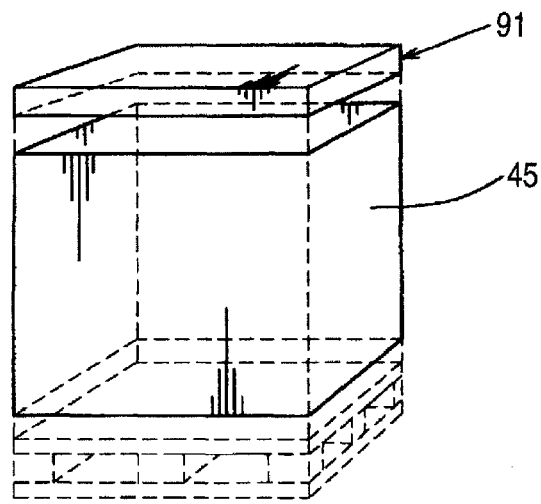
FIG. 16 is a schematic representation to describe a management top and a management container of other embodiments.
Figure 16:
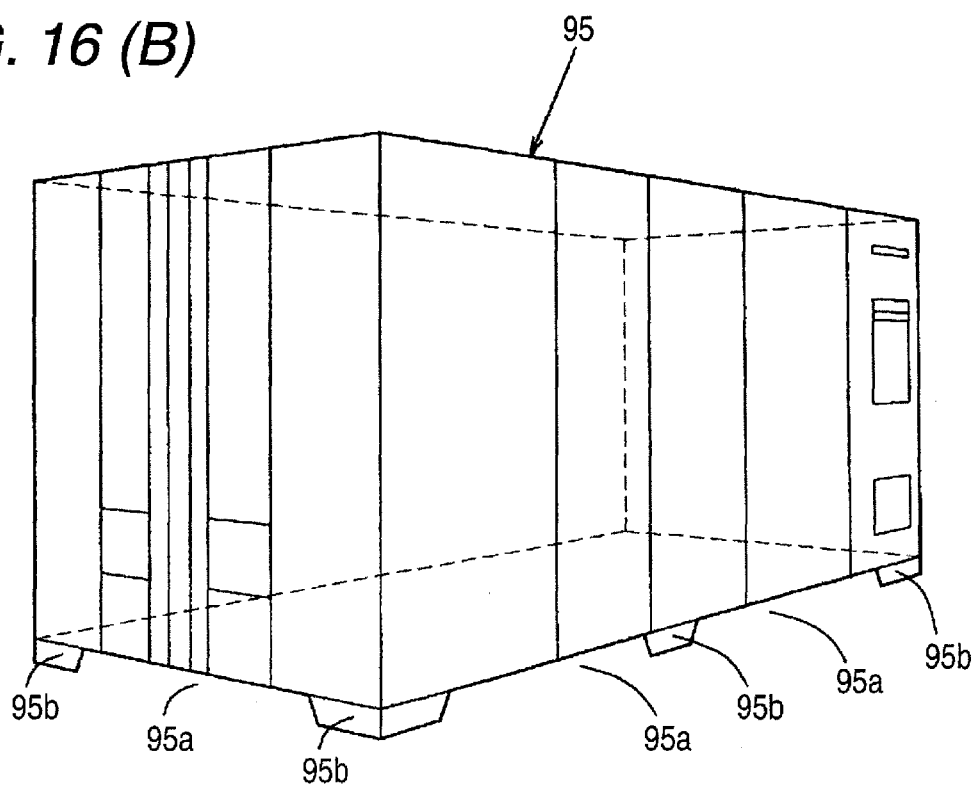
Figure 17:
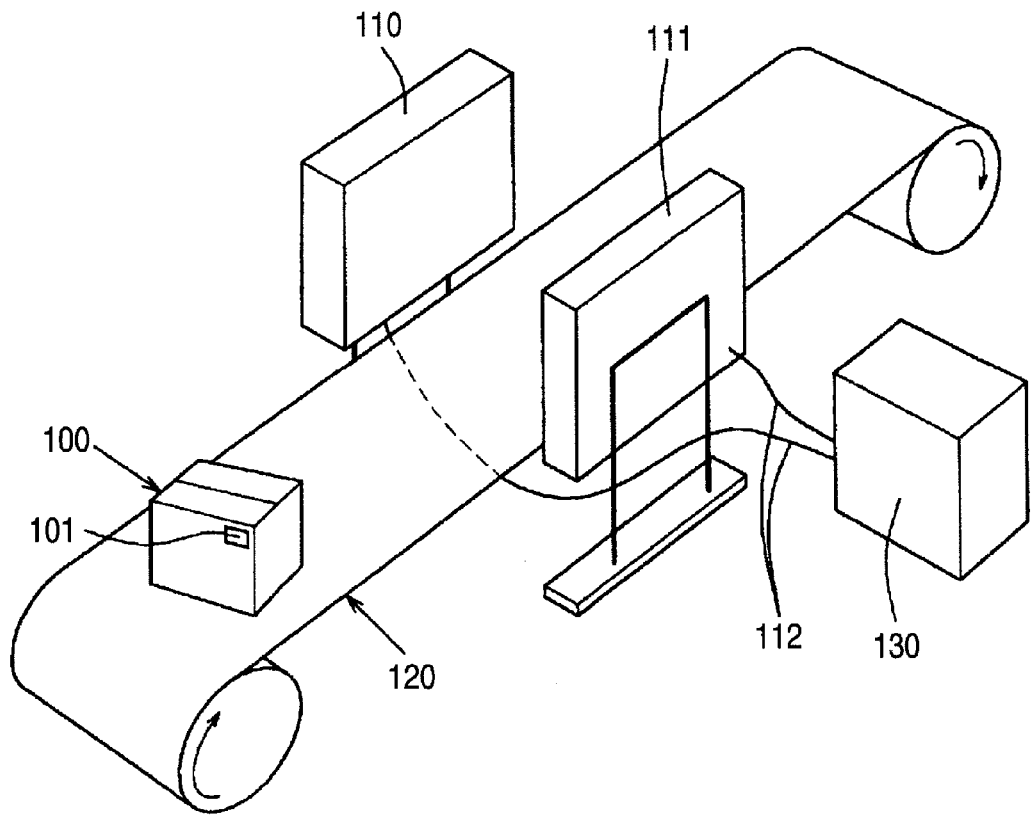
FIG. 17 is a perspective view of conveyor-type readers in a related art.
Figure 18:
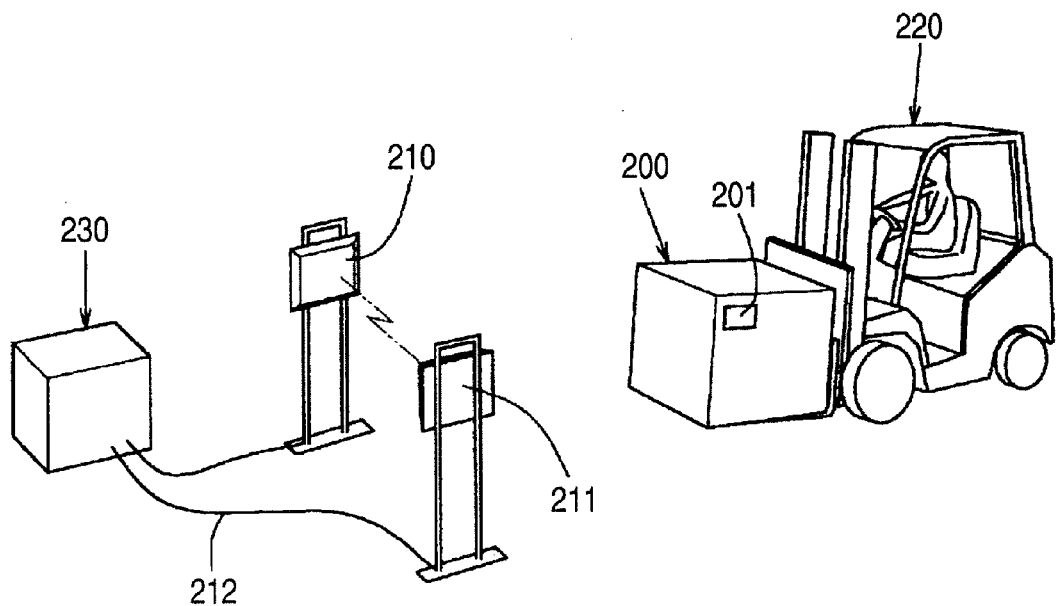
FIG. 18 is a perspective view of gate-type readers in a related art.
Figure 19:
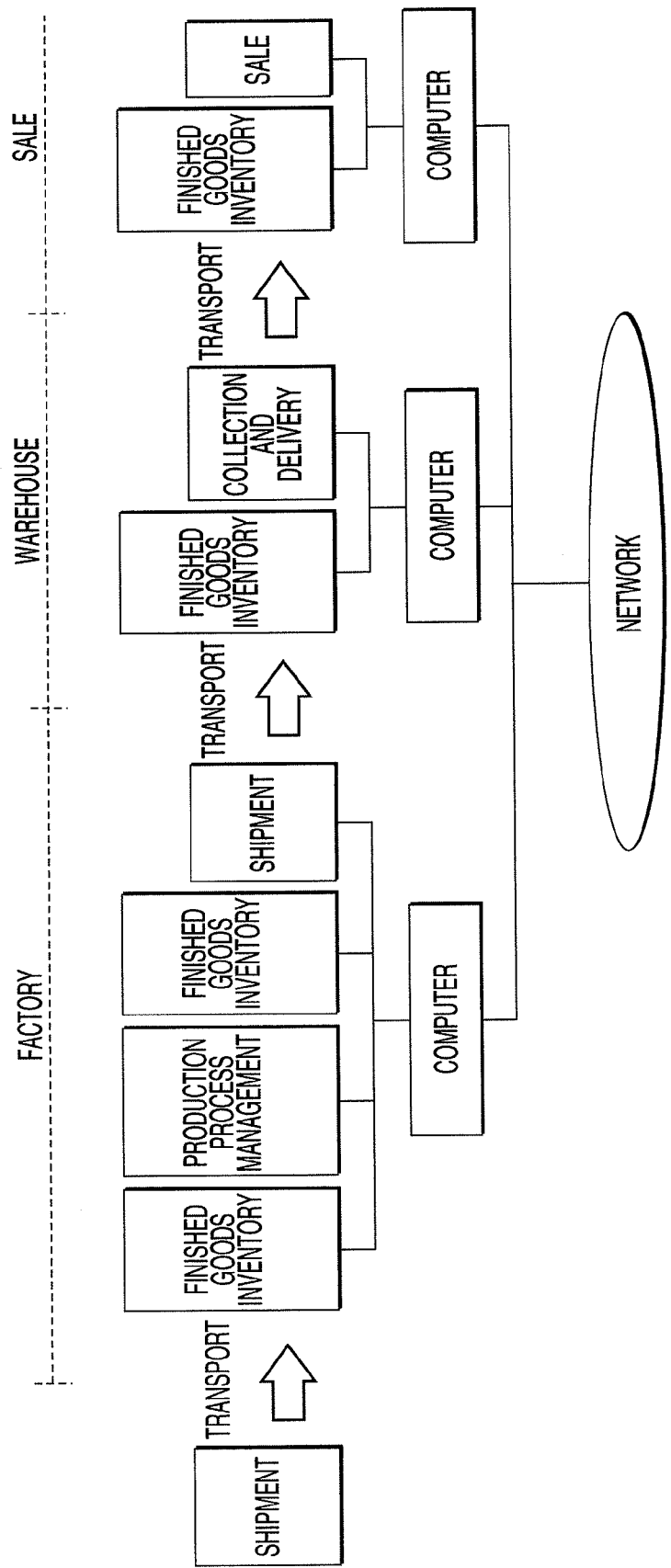
FIG. 19 is a system configuration drawing of a physical distribution management system in a related art.

The management pallet 30 may be formed as a management top plate 91 placed on the top of the articles loaded into the pallet as shown in a perspective view of FIG. 16 (A).

In this case, the controller 32, the mobile antenna 33, the GPS 34, the standard frequency broadcast receiver 35, the sensing unit 36, the IC tag reader/writer 37, and the battery 38 may be placed on the management top plate 91 at appropriate positions. It is advisable to dispose them at the same positions as those of the management pallet 30 described above by way of example.

In this case, it is advisable to place the IC tag reader/writer 37 with the communication area directed downward and top-bottom symmetrically with the case of the management pallet 30. It is advisable to wind an electromagnetic shield material 45 around a side of the article 51 as required so as not to communicate with the noncontact IC tag 55 of the adjacent article 51. Winding an electromagnetic shield material 45 can also be used in a similar manner for the management pallet 30 described above.

The management pallet 30 may be formed as a management container 95 shaped like a box as shown in a perspective view of FIG. 16 (B).

It is advisable to provide the management container 95 on the bottom with legs 95*b* in four corners and at the center in the length direction and fork insertion spaces 95*a* each between the legs 95*b* into which the fork 2*a* (FIG. 1) can be inserted.

In this case, it is advisable to place the sensing unit 36 and the IC tag reader/writer 37 inside the container and place the mobile antenna 33, the GPS 34, and the standard frequency broadcast receiver 35 on the outside of the container.

It is advisable to cover the container exterior with an electromagnetic shield material as required so as not to communicate with the noncontact IC tag 55 inside another adjacent container.

Accordingly, the temperature, humidity, and shock in the environment in which the article 51 in the container is placed can be acquired and appropriate communications with the noncontact IC tag 55 can be conducted. Appropriate communications with the GPS satellite 10 and the mobile communication network 60 can be conducted and the standard frequency broadcast can be received appropriately.

Such a configuration is adopted, whereby there can be provided the physical distribution management system 1 that can be used in response to a mode of transporting articles in a physical distribution process in addition to pallets and can be used in various transport methods.

If an apparatus including the components of the management pallet 30 described above rather than a material used for physical distribution is transported together with a plurality of articles 51 in the communication area of the IC tag reader/writer 37, similar advantages can be provided.

The controller 32 may be provided with a timer instead of installing the standard frequency broadcast receiver 35. In this case, the timer can count the time for producing a periodic record and recording the measurement time.

The periodic record may be executed upon reception of a command signal from the mobile antenna 33 rather than executed when the time acquired in the standard frequency broadcast receiver 35 reaches a predetermined time.

In this case, it is advisable to enter a record command manually from the mobile telephone 70 or transmit a record command signal at regular time intervals from the mobile telephone 70 or any other external terminal. Accordingly, the standard frequency broadcast receiver 35 cab be excluded from the components for reducing the cost.

The intra-warehouse position transmission tag 5 may not be placed in a warehouse and the processing of reading a position from the intra-warehouse position transmission tag 5 through the IC tag reader/writer 37 may not be executed (steps p4-p5, r3-r4, s5-s6 may be skipped).

Accordingly, if the position in the warehouse need not be grasped or if communications with the GPS satellite 10 can be conducted even in the warehouse, the cost can be reduced for using the system.

If GPS communications cannot be conducted in the warehouse, what position the article was stored in a warehouse existing at can be estimated from the positions where GPS communications can be conducted before and after GPS communications cannot be conducted.

To use the management pallet 30 only in one warehouse, the IC tag reader/writer 37 may communicate with the intra-warehouse position transmission tag 5 to determine the position in the warehouse without providing the management pallet 30 with the GPS 34.

In this case, the GPS 34 can be eliminated for reducing the cost and to manage the article storage positions in a huge warehouse, the system can be utilized effectively.

The management pallet 30 may not be provided with the sensing unit 36. Also in this case, the transport path can be recorded and the current position can be grasped, so that physical distribution process management appropriate for the article 51 not requiring temperature management, etc., can be accomplished at low cost.

The management pallet 30 may not be provided with the GPS 34. Also in this case, the temperature, humidity, and shock can be recorded and grasped and environmental management in the physical distribution process can be accomplished at low cost.

The management pallet 30 may be provided with neither the GPS 34 nor the mobile antenna 33. Also in this case, the temperature, humidity, and shock can be recorded and grasped and environmental certification in the physical distribution process can be accomplished at low cost.

A consignee noncontact IC tag recording the consignee name and the consignee ID may be previously passed to the consignee and when the article is received, the consignee name and the consignee ID may be read through the IC tag reader/writer 37 and may be recorded in the memory in the controller 32 together with the time and the position for guaranteeing reception of the article. Accordingly, trouble involved in article reception can be circumvented.

The noncontact IC tag 55 may record data of strict prohibition of shock, specified temperature, specified humidity, this side up, etc., as handling specification data. In this case, if the handling specification is violated, the controller 32 may execute warning processing.

For warning, it is advisable to provide the management pallet 30 with a sound output unit such as a loudspeaker for outputting a buzzer sound or warning voice or transmit mail to a predetermined address. It is advisable to record the warning destination in the noncontact IC tag 55.

Accordingly, for example, when an article 51 such as a perishable product requiring storage at temperatures in a predetermined range is transported, the transport requester, the consignee, etc., can monitor the transport state in real time.

Therefore, it is made possible to prevent the plan in the next step from coming to a standstill as the user finds out quality degradation of the article 51 in the physical distribution process after receiving the article 51. It is also made possible for the user to access the management pallet 30 from the mobile telephone 70 immediately upon reception of a warning, determine the warehouse and the physical distributor from the current position, etc., call the physical distributor, and request the physical distributor to move the article without delay to an environment satisfying the handling specification for suppressing degradation of the commodity.

If it is not assumed that a plurality of the management pallets 30 each loaded with the articles 51 are piled up, the electromagnetic shield material 45 can be eliminated for reducing the cost.

In the correspondence between the configuration of the invention and the embodiment described above, the article transport material of the invention corresponds to the management pallet 30 (30a, 30b, ... ), the management top plate 91, and the management container 95 of the embodiment. Likewise, the fork insertion section corresponds to the fork hole 31, the fork groove 31a, and the fork insertion space 95a; the control means corresponds to the controller 32; the external unit communication means corresponds to the mobile antenna 33; the information acquisition means corresponds to the GPS 34 and the sensing unit 36 (36a, 36b); the noncontact communication means corresponds to the IC tag reader/writer 37 (37a, 37b); the portable power supply means corresponds to the battery 38; the communication line corresponds to the mobile communication network 60; the external unit corresponds to the mobile telephone 70; the communication direction corresponds to inner upward or vertical upward; and the information concerning the placement situation corresponds to position, temperature, humidity, and shock; however, the invention is not limited to the configuration of the embodiment described above and a large number of embodiments can be provided.

While the invention has been described in detail with reference to the specific embodiments, it will be obvious to those skilled in the art that various changes and modifications can be made without departing from the spirit and the scope of the invention. This application is based on Japanese Patent Application (No. 2004-265341) filed on Sep. 13, 2004, which is incorporated herein by reference.

The invention claimed is:

1. An article transport material used for transporting an article, said article transport material comprising:
   a base adapted to load an article thereon;
   noncontact communication means for conducting noncontact communications with a noncontact IC tag put on the article; and
   portable power supply means for supplying electric power to the noncontact communication means,
   wherein a transmission direction of said noncontact communication means is directed inward above the base, so that a communication area of said noncontact communication means is set to allow reliable communication only with the noncontact IC tag of an article loaded on said base.

2. The article transport material as claimed in claim 1 wherein the communication distance of said noncontact communication means is limited to such an extent that said noncontact communication means would be able to communicate with a noncontact IC tag within the loading range in which articles can be loaded above the base.

3. The article transport material as claimed in claim 1 wherein a plurality of said noncontact communication means are disposed in the periphery of the base and the communication direction of each noncontact communication means is directed to an upper inside of the article transport material.

4. The article transport material as claimed in claim 1, comprising a fork insertion section for allowing a fork of a forklift to insert from a side, wherein said means are disposed circumventing the fork insertion section.

5. The article transport material as claimed in claim 4 wherein said means are disposed circumventing the top and bottom positions of the fork insertion section.

6. The article transport material as claimed in claim 1, comprising an electromagnetic shield for blocking a radio wave so as not to communicate with a noncontact IC tag outside the area above the base.

7. The article transport material as claimed in claim 1, comprising external unit communication means for communicating with an external unit through a communication line aside from said noncontact communication means and control means for controlling execution of communications with the noncontact IC tag in accordance with an execution command signal received from the external unit and transmission of acquired information to the external unit.

8. The article transport material as claimed in claim 7 wherein the external unit communication means is disposed in a side part of a whole shape of the article transport material.

9. The article transport material as claimed in claim 1, wherein the whole shape of the article transport material is formed like a pallet shape for placing the article.

10. The article transport material as claimed in claim 1, wherein the whole shape of the article transport material is formed like a box container shape for storing the article.

11. The article transport material as claimed in claim 1, further comprising information acquisition means for acquiring information concerning situation of a place at which the article transport material is placed.

12. The article transport material as claimed in claim 1, comprising a pallet for placing an article thereon and a top plate placed on the top of the article loaded into the pallet, wherein the means are disposed on the top plate.

\* \* \* \* \*